United States Patent
Taku

[11] Patent Number: 5,809,359
[45] Date of Patent: Sep. 15, 1998

[54] CAMERA HAVING OPERATOR FOR OPENABLE AND CLOSABLE FILM CARTRIDGE MOVABLE AXIALLY OF A CARTRIDGE RECEIVING CHAMBER

[75] Inventor: Masakazu Taku, Kanagawa-ken, Japan

[73] Assignee: Canon Kabushiki Kaisha, Tokyo, Japan

[21] Appl. No.: 943,620

[22] Filed: Oct. 3, 1997

Related U.S. Application Data

[63] Continuation of Ser. No. 526,579, Sep. 11, 1995, abandoned.

[30] Foreign Application Priority Data

Sep. 21, 1994 [JP] Japan ................................ 6-251572

[51] Int. Cl.$^6$ ............................................ G03B 17/02
[52] U.S. Cl. ......................... 396/513; 396/538; 242/348
[58] Field of Search ............................. 396/439, 511, 396/512, 513, 535, 538; 242/348

[56] References Cited

U.S. PATENT DOCUMENTS

| | | | |
|---|---|---|---|
| 5,132,715 | 7/1992 | Taillie | 354/105 |
| 5,136,318 | 8/1992 | Aoshima | 354/105 |
| 5,155,511 | 10/1992 | Tamamura | 354/76 |
| 5,231,438 | 7/1993 | Smart | 354/281 |
| 5,357,303 | 10/1994 | Wirt | 396/513 |

FOREIGN PATENT DOCUMENTS 6-82972  3/1994  Japan .

Primary Examiner—Eddie C. Lee
Assistant Examiner—J. K. Han
Attorney, Agent, or Firm—Robin, Blecker & Daley

[57] ABSTRACT

An apparatus to which an openable and closable film cartridge is applied, the film cartridge having an engaging part for opening and closing thereof, comprises a first device for causing at least one of opening and closing operations of the cartridge to be performed by engagement with the engaging part and a second device for enabling the first device to advance and retract along an axis of the engaging part.

80 Claims, 19 Drawing Sheets

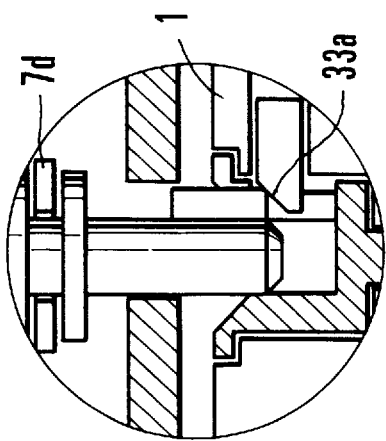
F I G. 8(c)
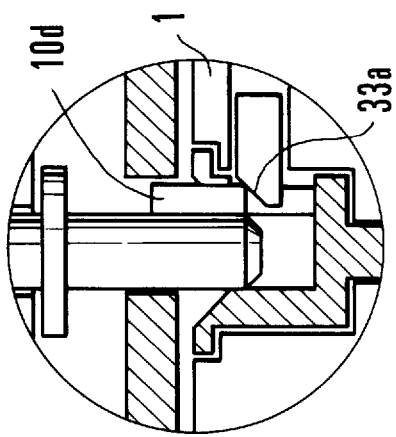
F I G. 8(b)
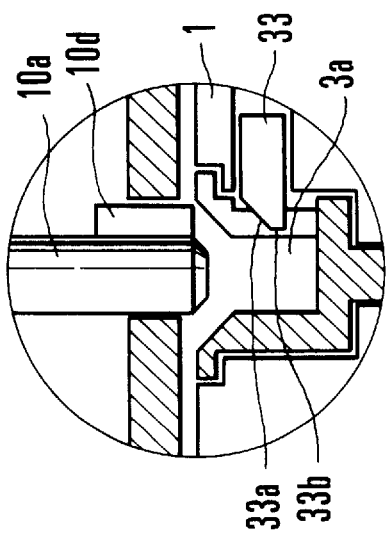
F I G. 8(a)
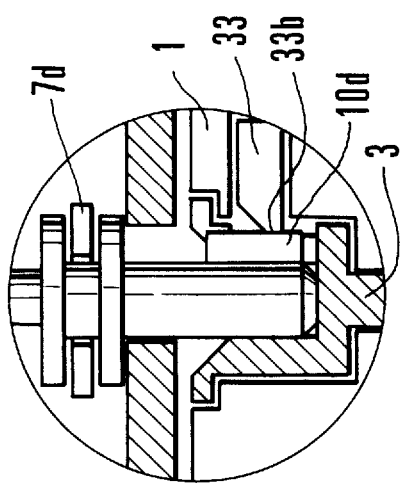
F I G. 8(e)
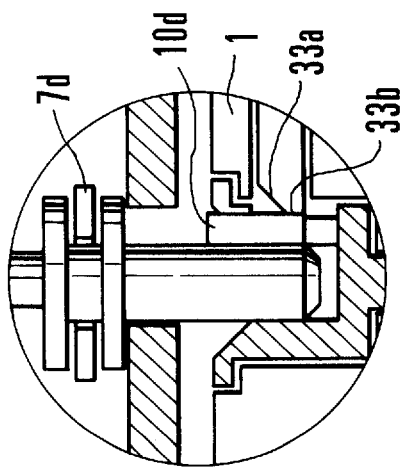
F I G. 8(d)

CAMERA HAVING OPERATOR FOR OPENABLE AND CLOSABLE FILM CARTRIDGE MOVABLE AXIALLY OF A CARTRIDGE RECEIVING CHAMBER

This is a continuation application under 37 CFR 1.62 of prior application Ser. No. 08/526,579, filed Sep. 11, 1995, now abandoned.

BACKGROUND OF THE INVENTION

1. Field of the Invention

This invention relates to an improvement on a camera or an apparatus to which an openable and closable film cartridge is applied.

2. Description of the Related Art

In U.S. patent application Ser. No. 08/304,946, commonly assigned to the assignee of this invention, there is disclosed a camera to which an openable and closable film cartridge, such as a film cartridge of the kind having an openable and closable film putting-out door (window) arranged to shut and cover a film exit provided in the film cartridge, is applied. In that camera, a driving member provided in the camera is caused to be inserted into an engaging part provided in the film cartridge for opening and closing the film putting-out door, in response to the insertion of the film cartridge into a cartridge chamber of the camera, and is caused to open and close the film putting-out door in association with opening and closing actions of a lid provided for the cartridge chamber.

The prior art arrangement cited above, however, has presented a problem. The engaging part provided in the film cartridge for opening and closing the film putting out door engages the driving member provided in the camera, when the film cartridge is loaded in the cartridge chamber. Therefore, if the lid of the cartridge chamber happens to be left open over a long period of time, a lock member provided for the film putting-out door would be deformed, or damaged by a creep phenomenon or the like. In such a case, it becomes impossible to lock the film putting-out door. Under such a condition, the film cartridge would be insufficiently shielded from light after it is taken out from the cartridge chamber. Then, a film contained in the film cartridge, in a used or unused state, would be accidentally exposed to light.

SUMMARY OF THE INVENTION

In accordance with one aspect of this invention, there is provided a camera or an apparatus to which an openable and closable film cartridge is applied, comprising first means for causing at least one of opening and closing of the film cartridge to be performed, and second means for enabling the first means to advance and retract, so that the film cartridge can be prevented from being deformed or damaged.

The above and other aspects and features of this invention will become apparent from the following detailed description of preferred embodiments thereof taken in connection with the accompanying drawings.

BRIEF DESCRIPTION OF THE DRAWINGS

FIGS. 8(a) to 8(e) show changes in the engaging state of the driving member and the engaging part of the door.

DETAILED DESCRIPTION OF THE PREFERRED EMBODIMENTS

Preferred embodiments of this invention are described below with reference to the drawings (First Embodiment)

Figure 1:
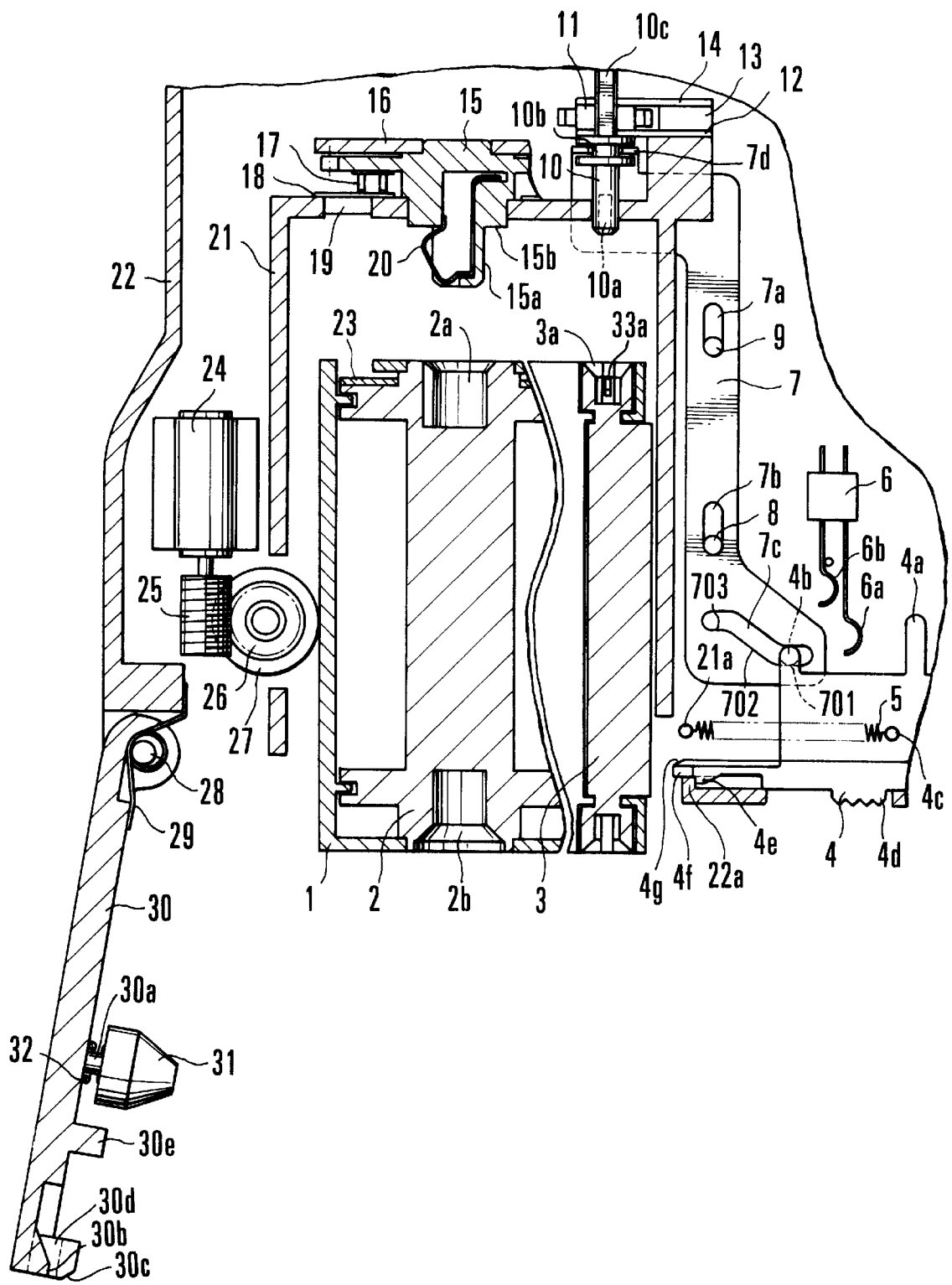
FIG. 1 is a front sectional view showing in detail a cartridge chamber and parts around it of a camera arranged as a first embodiment of this invention.
Figure 2:
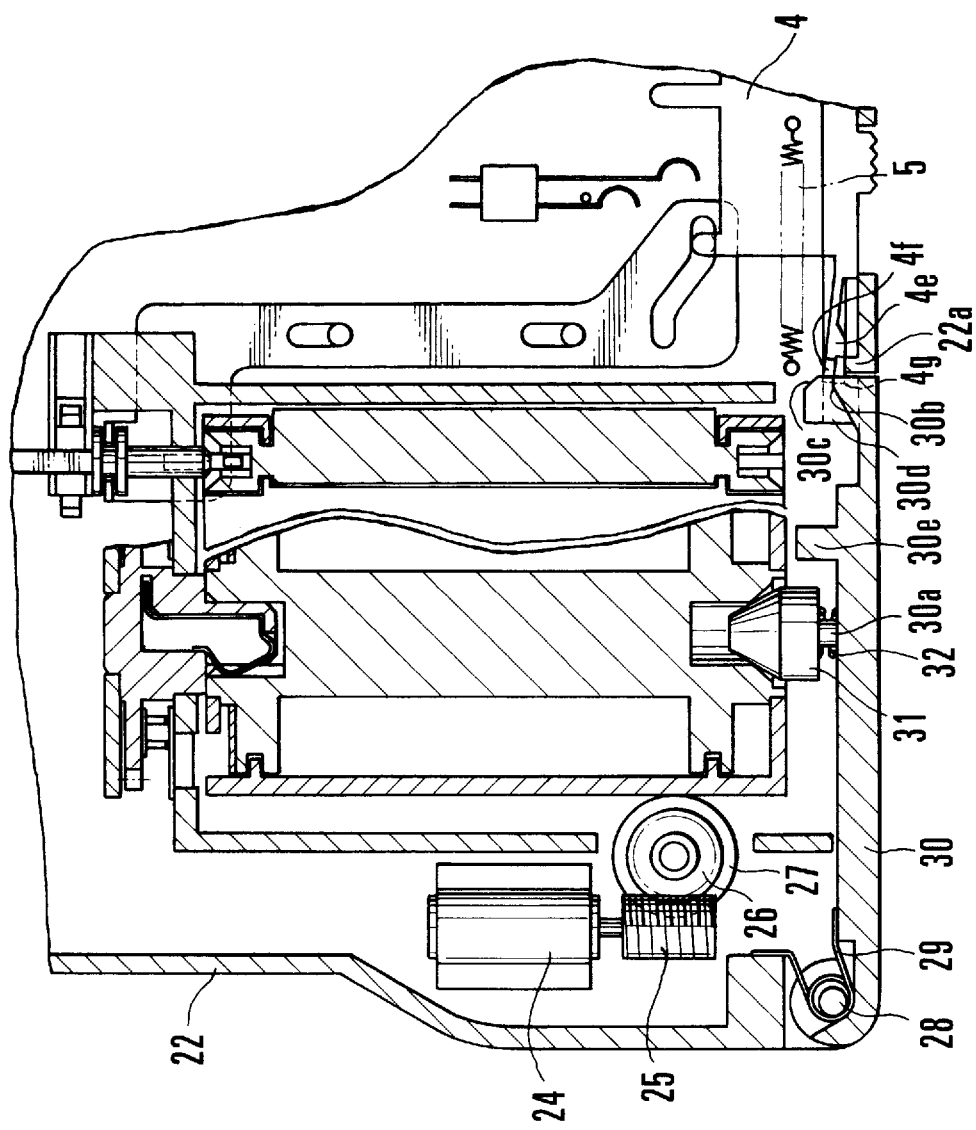
FIG. 2 is a front sectional view showing the same camera in a state obtained when a cartridge chamber lid is closed in the arrangement shown in FIG. 1.
Figure 3:
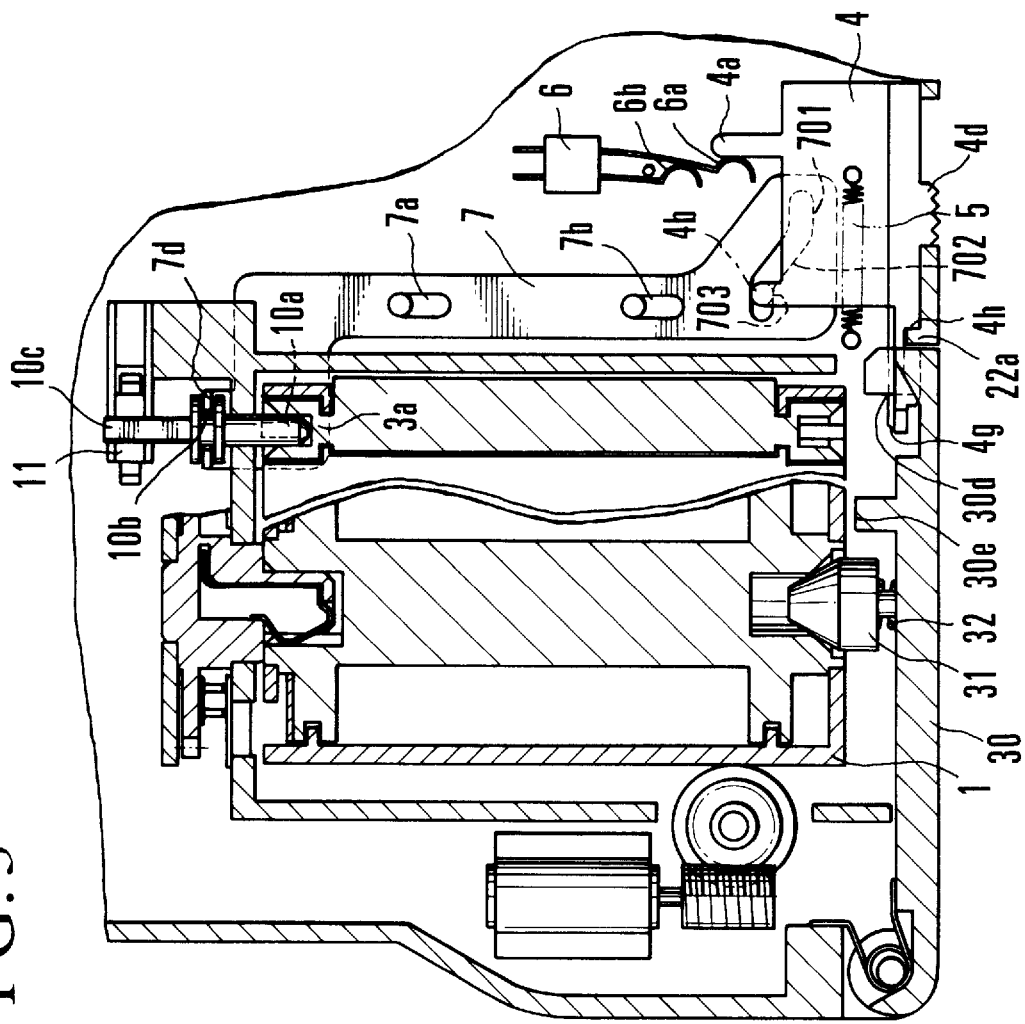
FIG. 3 is a front sectional view showing the same camera in a state obtained when a locking operation is performed with the camera in the state of FIG. 2.
Figure 4:
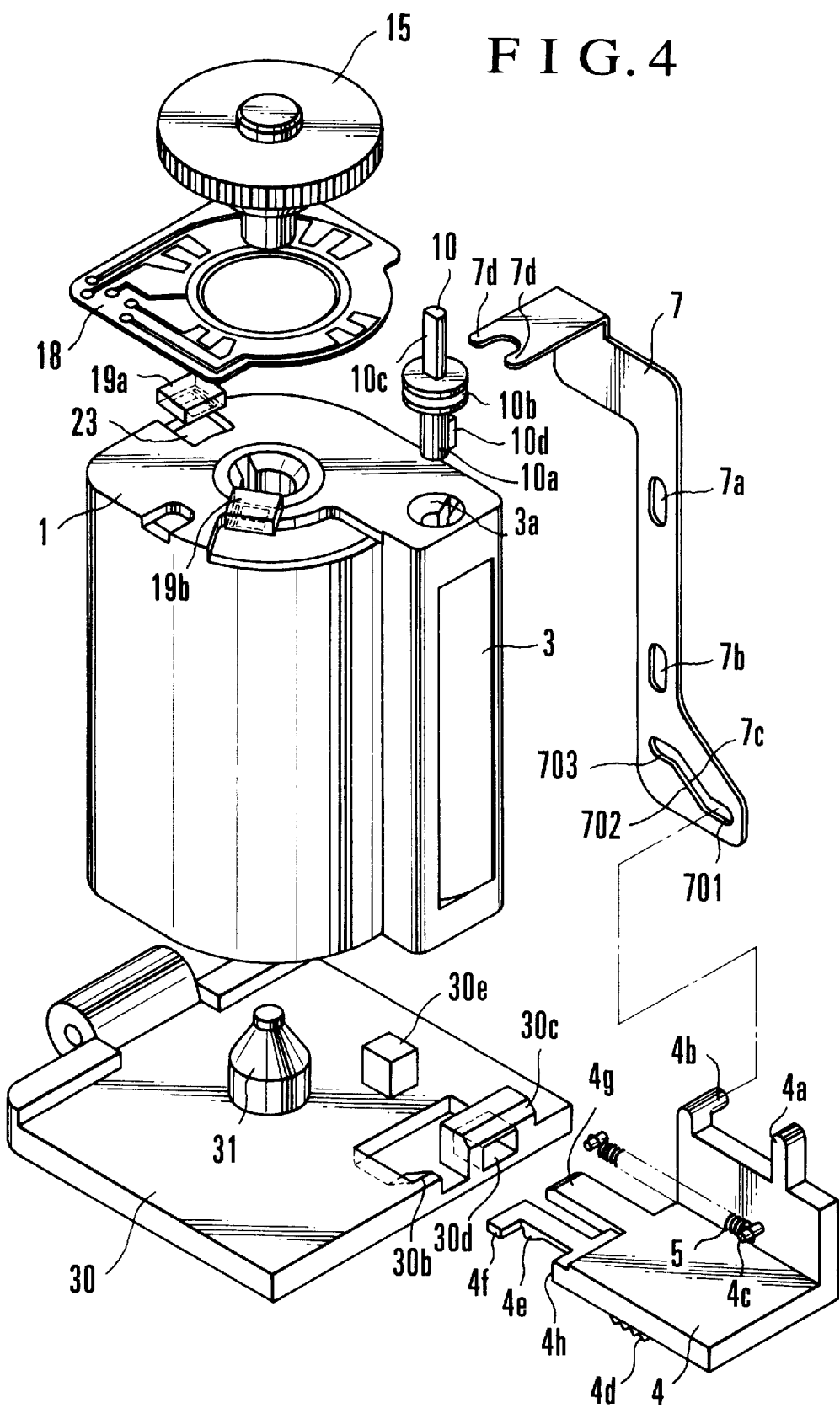
FIG. 4 is an exploded oblique view showing the essential parts of the camera shown in FIG. 1.

FIG. 1 is a front sectional view showing in detail a cartridge chamber part of a camera arranged as a first embodiment of this invention. FIG. 2 is also a front sectional view showing the camera in a state obtained with the lid of the cartridge chamber closed in the arrangement shown in FIG. 1. FIG. 3 is a front sectional view showing the camera in a state obtained when a locking action is performed in the state shown in FIG. 2. FIG. 4 is an exploded oblique view showing the essential parts of the camera shown in FIG. 1.

Referring to FIGS. 1 to 4, a film cartridge 1 carries therein a film take-up spool 2 which is provided with fit engaging parts 2a and 2b. The film cartridge 1 is provided with a door 3 for permitting a film to be put out from the film cartridge 1. The door 3 is arranged to have a light blocking property when it is closed. To keep the door 3 in the closed state, there is provided a lock member 33 (see FIG. 5) at an engaging part 3a which is arranged to engage a pin-shaped driving member 10 provided for driving the door 3 to open and close. An opening-and-closing member 4 for a cartridge chamber lid 30 is supported to be slidable right and left. The opening-and-closing member 4 is provided with a projection 4a which is arranged to turn on and off a switch 6, a shaft 4b which is arranged to be in fitted engagement with a cam face 7c of a cam plate 7, a hook part 4c, an operation part 4d, a lock part 4e, a projection 4f and a lock claw part 4g. The operation part 4d which is arranged to be operated in opening the cartridge chamber lid 30 has a non-slip serration.

The projection 4f is provided on an extension of the lock part 4e for allowing the lock part 4e to escape from a stopper part 22a when the cartridge chamber lid 30 is closed. More specifically, when the cartridge chamber lid 30 is closed, an abutting part 30b of the cartridge chamber lid 30 pushes up the projection 4f to enable the lock part 4e to escape from the stopper part 22a. Then, the opening-and-closing member 4 is caused to move to the left, i.e., in the direction of closing, by a spring 5. As a result, the lock claw part 4g comes into a hole part 30d provided in the cartridge chamber lid 30, thereby finishing a locking action on the cartridge chamber lid 30.

The spring 5, which is arranged to urge the opening-and-closing member 4 to close, is attached to a hook part 4c and a spring peg 21a secured to the body 21 of the camera. When the operation part 4d is slid in the direction of opening (to the right) against the force of the spring 5, the lock part 4e overrides the protruding part of the stopper part 22a of the cover 22 (FIG. 2). The lock part 4e then abuts on the stopper part 22a, as shown in FIG. 1, to keep the opening-and-closing member 4 in an opening position.

The cam plate 7 is arranged to be vertically slidable to an extent defined by slots 7a and 7b through shafts 8 and 9 which are secured to the body 21. The cam plate 7 is thus vertically movable in association with the opening-and-closing member 4 through the shaft 4b and a cam face 7c of the cam plate 7. The driving member 10, which is arranged to fittingly engage the engaging part 3a of the film putting-out door 3 of the film cartridge 1 to open and close the door 3, has a circular groove 10b engaging an engaging part 7d of the cam plate 7. The driving member 10 is thus arranged to vertically move in association with the vertical motion of the cam plate 7 and to be rotatable at each of its vertical positions.

The driving member 10 is provided with an engaging part 10a which fittingly engages the engaging part 3a of the film putting-out door 3 of the cartridge 1, a projection 10d, the circular groove 10b and a cut part 10c. When coming into fitted engagement with the engaging part 3a, the engaging part 10a (shown in FIG. 4) acts to cause the lock member 33 of the door 3 to escape and rotationally engages the engaging part 3a while remaining in a state of being interlocked with a gear 11 irrespective as to whether the driving member 10 is in an upper or lower position. The gear 11 is arranged to be rotatable by means of a motor or the like which is not shown.

Plates 12, 13 and 14 are secured to the camera body 21 by means of screws or the like and are arranged to rotatably support the driving member 10 and the gear 11. A fork gear 15 is provided with a fit engaging part 15a and an abutting face 15b and is rotatably supported by a retaining plate 16 and the camera body 21. A contact 17 is fixed to the lower surface of the fork gear 15 to permit detection of the rotational phase of the fork gear 15 by means of a phase printed circuit board 18. The fit engaging part 15a, which fittingly engages the fit engaging part 2a of the spool 2 of the film cartridge 1, is provided with an engaging spring 20 for rotationally engaging the spool 2. Further, the abutting face 15b of the fork gear 15 serves as a datum plane on which the spool 2 comes to abut in loading the film cartridge 1.

A photo-reflector 19 is arranged to detect the presence or absence of the film cartridge 1 and the bar code data of a data disk plate 23 which is secured to the upper side of the speel 2. There are provided two photo-reflectors 19a and 19b. A motor 24 is arranged to drive a roller 27 for pulling in and ejecting the cartridge 1. The rotation of a worm gear 25 which is rotated by the motor 24 is transmitted to a gear 26 which is arranged to rotate integrally with the roller 27. There are provided a shaft 28 and a spring 29.

The cartridge chamber lid 30 is provided with a shaft 30a, the abutting part 30b, a slanting face 30c, the hole part 30d and a projection 30e and is rotatably supported by a cover 22 through the shaft 28. The spring 29 is arranged to constantly urge the cartridge chamber lid 30 to turn in the direction of opening. A support member 31 is mounted on the shaft 30a and is arranged to support the spool 2 of the film cartridge 1 in such a way as to counteract the supporting action of the fork gear 15 on the spool 2 when the film cartridge 1 is loaded. The support member 31 is arranged to be rotatable with respect to the shaft 30a and to be also axially movable in such a way as to push the spool 2 against the abutting face 15b of the fork gear 15 by means of a spring 32 when the cartridge chamber lid 30 is closed.

The slanting face 30c of the cartridge chamber lid 30, which is formed above the hole part 30d provided for allowing the lock claw part 4g of the opening-and-closing member 4 to enter when the cartridge chamber lid 30 is completely closed, is arranged to temporarily lock the cartridge chamber lid 30 in such a manner that, when the cartridge chamber lid 30 is closed, the slanting face 30c pushes the fore end of the lock claw part 4g to cause the opening-and-closing member 4 to slide a little to the right and to allow the lock claw part 4g to enter the hole part 30d without fail upon completion of closing of the cartridge chamber lid 30. The projection 30e is arranged to restrict an extent to which the cartridge 1 is movable downward against the pushing-up force of the spring 32 of the support member 31 when the driving member 10 comes to engage the engaging part 3a of the door 3 upon completion of closing and locking of the cartridge chamber lid 30 by the opening-and-closing member 4. The projection 30e is of course set at such a height that permits the camera to be loaded with the film cartridge 1 even when the film cartridge 1 is of a maximum size. The height of the projection 30e is set to bring about a state in which the projection 10d of the driving member 10 overrides the slanting face 33a of the lock member 33 as shown in FIG. 8(d) when there is obtained a state shown in FIG. 6 as will be described later.

The camera arranged as the first embodiment of this invention as described above operates as follows.

FIG. 1 shows the camera in a state obtained while the film cartridge 1 is in process of being loaded by means of the motor. The opening-and-closing member 4, in this state, has the lock part 4e abutting on the stopper part 22a and is thus locked in its "open" position. The cam plate 7 is held in its highest position and the driving member 10 is retracted from the cartridge chamber. In loading the film cartridge 1 by driving the roller 27 with the motor, therefore, a load on the motor 24 includes only a frictional force developed when the film cartridge 1 is pushed by the roller 27 against the cartridge chamber, a charging force of the engaging spring 20 provided for the fork gear 15 and a fit engaging frictional force arising when the fit engaging part 15a of the fork gear 15 is fitted into the fit engaging part 2a of the spool 2a. The load on the motor 24 is thus greatly mitigated by the arrangement of the embodiment. When the spool 2 comes to abut on the abutting face 15b of the fork gear 15 with the motor 24 driven further from the state of FIG. 1, the photo-reflector 19 detects the data disk 23, so that the motor 24 is stopped from rotating at that point of time.

After that, the user of the camera usually closes the cartridge chamber lid 30. Here, even if the cartridge chamber lid 30 is intentionally left open for a long period of time, the lock member 33 of the door 3 is neither deformed nor damaged since the driving member 10 is not engaging the engaging part 3a of the door 3. FIG. 2 shows the camera in a state in which the cartridge chamber lid 30 is closed but has not yet been completely locked.

Further, even if the spool 2 is not abutting on the abutting face 15b of the fork gear 15, as shown in FIG. 1, the spool 2 can be caused to abut on the abutting face 15b of the fork gear 15 when the cartridge chamber lid 30 is closed as the spring 32 causes the support member 31 to push the spool 2 toward the fork gear 15. The force of the spring 32 for pushing up the spool 2 is of course arranged to be larger than a force exerted by the roller 27 for stopping the film cartridge 1.

In the process of shifting from the state of FIG. 1 to the state of FIG. 2, the opening-and-closing member 4 is slid to the right by temporarily pushing the lock claw part 4g with the slanting face 30c. When the hole part 30d comes to its position as shown in FIG. 2, the spring 5 causes the opening-and-closing member 4 to move again to the left. The fore end of the lock claw part 4g then comes into the hole part 30d to a small extent and a temporary locking action comes to an end. At the same time, the abutting part 30b pushes the projection 4f upward to disengage the lock part 4e from the stopper part 22a, so that the opening-and-closing member 4 is allowed to move to the left by the spring 5.

FIG. 3 shows the camera in a state obtained when the cartridge chamber lid 30 is completely locked with the opening-and-closing member 4 moved to the left and when the driving member 10 is completely engaging the engaging part 3a of the door 3. The state of FIG. 2 shifts to the state of FIG. 3 as follows. The lock part 4e of the opening-and-closing member 4 first disengages the stopper part 22a to allow the opening-and-closing member 4 to be moved to the left by the spring 5. The operation part 4d then comes to abut on the end face of a hole of the cover 22 to completely lock the cartridge chamber lid 30.

Then, the shaft 4b of the opening-and-closing member 4 which is fitted in the cam face 7c of the cam plate 7 also moves to the left. The cam face position of the shaft 4b then shifts in the order of 701→702→703. As a result, the cam plate 7 moves downward as much as the amount of lift of the cam face. The engaging part 7d is also made to move downward by such a movement, thereby causing the driving member 10 to be inserted into the engaging part 3a of the door 3. At the same time that the driving member 10 completely engages the engaging part 3a, the projection 4a turns on the switch 6 from its off-state. With the switch 6 thus turned on, a signal which indicates that the driving member 10 and the engaging part 3a have completely engaged each other is transmitted to a control IC which is not shown. Then, the gear 11 is driven to cause the film putting-out door 3 to be opened by the driving member 10. The fork gear 15 is driven to make the film ready for photographing.

Further, in the process of shift from the state of FIG. 2 to the state of FIG. 3, the film cartridge 1 is pushed upward by the spring 32 of the support member 31. However, when the driving member 10 enters the engaging part 3a of the door 3, the film cartridge 1 temporarily moves downward to abut on the projection 30e and then moves upward again into the state as shown in FIG. 3. This state is further described with reference to FIGS. 5, 6, 7 and 8(a) to 8(e).

Figure 5:
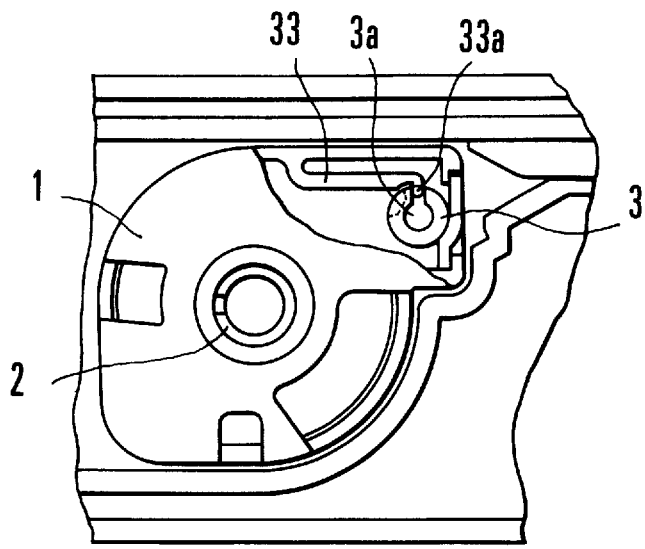
FIG. 5 is a plan view showing the camera in a state obtained before a driving member shown in FIG. 4 is inserted into an engaging part of a door.
Figure 6:
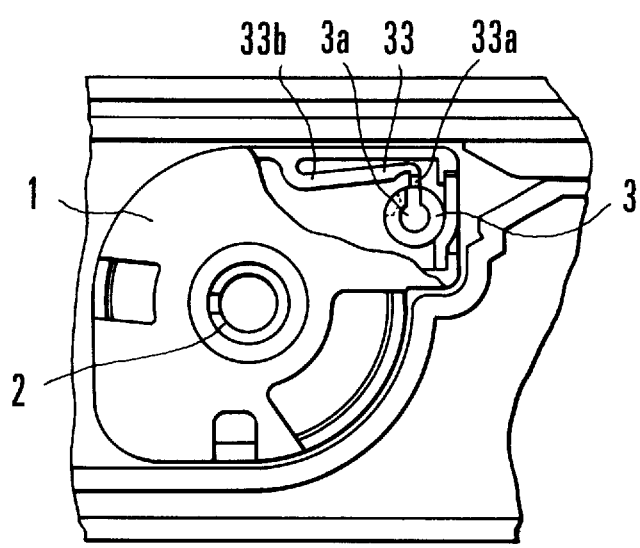
FIG. 6 is a plan view showing the camera in a state obtained when the door is rendered rotatable by pushing a lock member with the engaging part when the driving member is inserted into the engaging part of the door.

FIG. 5 shows the film cartridge 1 in a state obtained before the driving member 10 is inserted into the engaging part 3a of the door 3. The door 3 is locked by the fore end 33a of the lock member 33 and is not rotatable. FIG. 6 shows a state obtained with the driving member 10 inserted into the engaging part 3a of the door 3. The projection 10d of the driving member 10 pushes the fore end 33a of the lock member 33 to disengage the fore end 33a from the engaging part 3a by elastically deforming the arm part 33b of the lock member 33, so that the door 3 can be rendered rotatable.

Figure 7:
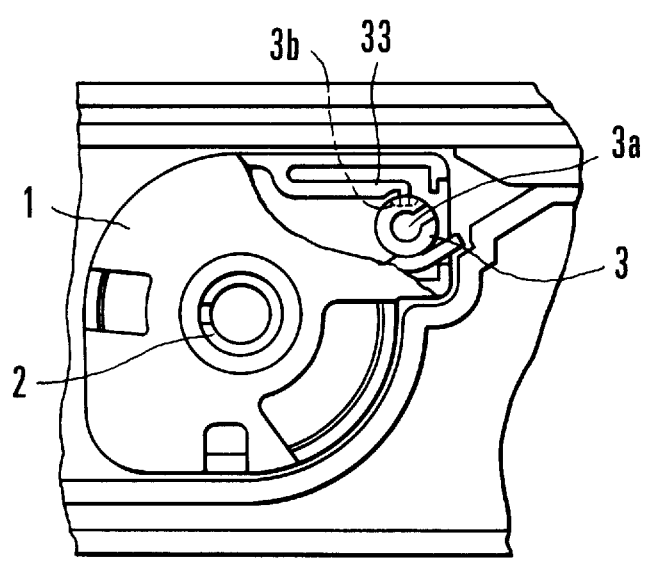
FIG. 7 is a plan view showing a state obtained when the door is opened by the rotation of the driving member.

If the camera is left in the state of FIG. 6 over a long period of time, the arm part 33b which is elastically deformed tends to be deformed or cracked by a creep phenomenon or the like. As a result, even if the driving member 10 is retracted, the door 3 might fail to be locked by the fore end 33a of the lock member 33. Under such a condition, the door 3 tends to open to ruin an exposed film by accidentally exposing the film to light. Such an accident can be effectively prevented by arranging the door 3 to be opened by rotating the driving member 10 as shown in FIG. 7 (to turn the door 3 clockwise as viewed on the drawing) after the driving member 10 is inserted as shown in FIG. 6. With the driving member 10 thus rotated, a recessed part 3b which is formed in the door 3 prevents the lock member 33 from receiving a stress, in the same manner as in the state of FIG. 5, so that the arm part 33b can be prevented from being deformed or damaged.

FIG. 8(a) shows a state obtained with the film cartridge 1 completely loaded. In this state, the driving member 10 is in a retracted position. FIG. 8(b) shows a state in which, when the cartridge chamber lid 30 is closed and the opening-and-closing member 4 is moved by the spring 5 to begin pushing the driving member 10 downward, the lower end of the projection 10d of the driving member 10 abuts on the slanting face of the fore end 33a of the lock member 33. In this state, when the driving member 10 is caused to move further downward, the force of moving the lock member 33 to the right is caused by the abutment of the lower end of the protruding part 10d of the driving member 10 on the slanting face of the fore end 33a of the lock member 33 to become larger than the elastic energy of the arm part 33b. As a result, the lock member 33 comes to move to the right. Then, when the driving member 10 is pushed to move downward still further, the film cartridge 1 moves downward to prevent unlocking as shown in FIG. 8(c). When the film cartridge 1 moves down to abut on the projection 30e of the cartridge chamber lid 30 as shown in FIG. 8(c), the film cartridge 1 is no longer allowed to move downward. In the state of FIG. 8(c), if the driving member 10 is further pushed down, the fore end 33a of the lock member 33 is caused to unlock the door 3 by the slanting face of the fore end 33a, as shown in FIG. 8(d), because the film cartridge 1 does not move downward any further. The fore end face 33b of the lock member 33 is of course abutting on the side face of the projection 10d. However, since there remains no downward urging force on the driving member 10, the film cartridge 1 is pushed up again to its position shown in FIG. 8(a) by the spring 32 of the support member 31, and the state of FIG. 8(d) thus can be brought into a state shown in FIG. 8(e). The film cartridge 1 is thus temporarily moved downward and again pushed to the set position of the fork gear 15 after the cartridge chamber lid 30 is closed until the lock member 33 unlocks the door 3. It is of course possible to prevent the film cartridge 1 from being pushed downward by the driving member 10 by arranging the spring 32 of the cartridge support member 31 to have a larger force. However, a load on the rotation of the fork gear 15 would become larger as a result of such arrangement.

While the projection 30e is arranged in this case, the same advantageous effect is attainable by arranging the stroke of the support member 31 to stop at a position where the film cartridge 1 of a maximum size can be set and where the film cartridge 1 can be set in the state of FIG. 8(d). The arrangement of setting the film cartridge 1 by such a movement permits a reduction in the force of pushing the motor-driven pulling-in roller 27 against the film cartridge 1, so that any unnecessary stress can be prevented from being applied to the film cartridge 1. Further, the necessary spring force of the spring 32 for the fork gear 15 also can be minimized, so that a load on film transportation can be minimized for saving energy.

Further, the driving member 10 is arranged to engage the engaging part 3a of the door 3 in association with the closing action of the cartridge chamber lid 30. By virtue of the arrangement, the lock member 33 of the door 3 is never deformed nor damaged even if the cartridge chamber lid 30 is left open over a long period of time with the film cartridge 1 remaining loaded.

(Second Embodiment)

A second embodiment of this invention is next described with reference to FIGS. 9 to 21. The component parts of the second embodiment arranged in the same manner as those of the first embodiment are indicated by the same reference numerals.

Figure 9:
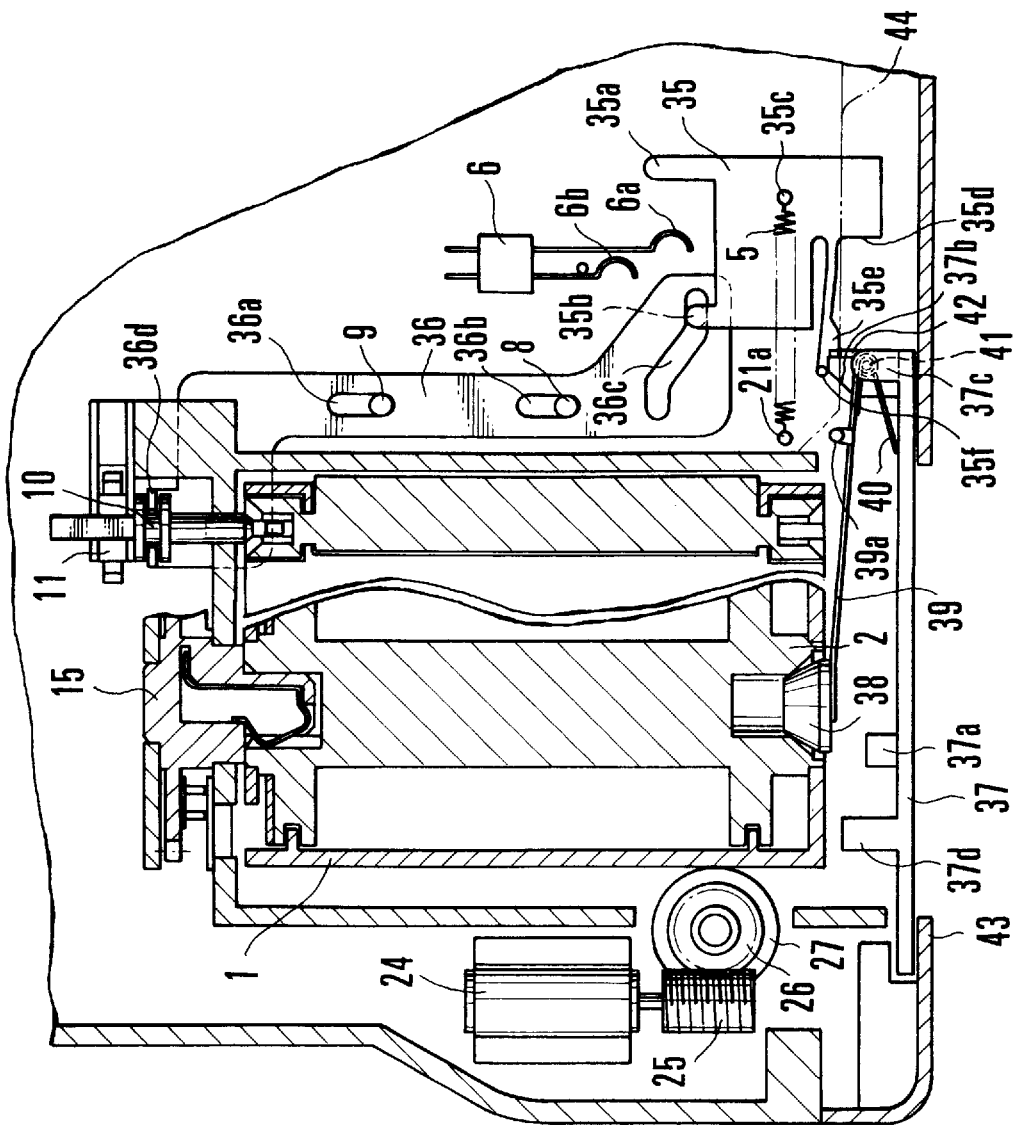
FIG. 9 is a front sectional view showing the interlocked state of an interlocking member and a cam plate formed to correspond to the action of a camera having a sliding type cartridge chamber lid, according to a second embodiment of this invention.
Figure 10:
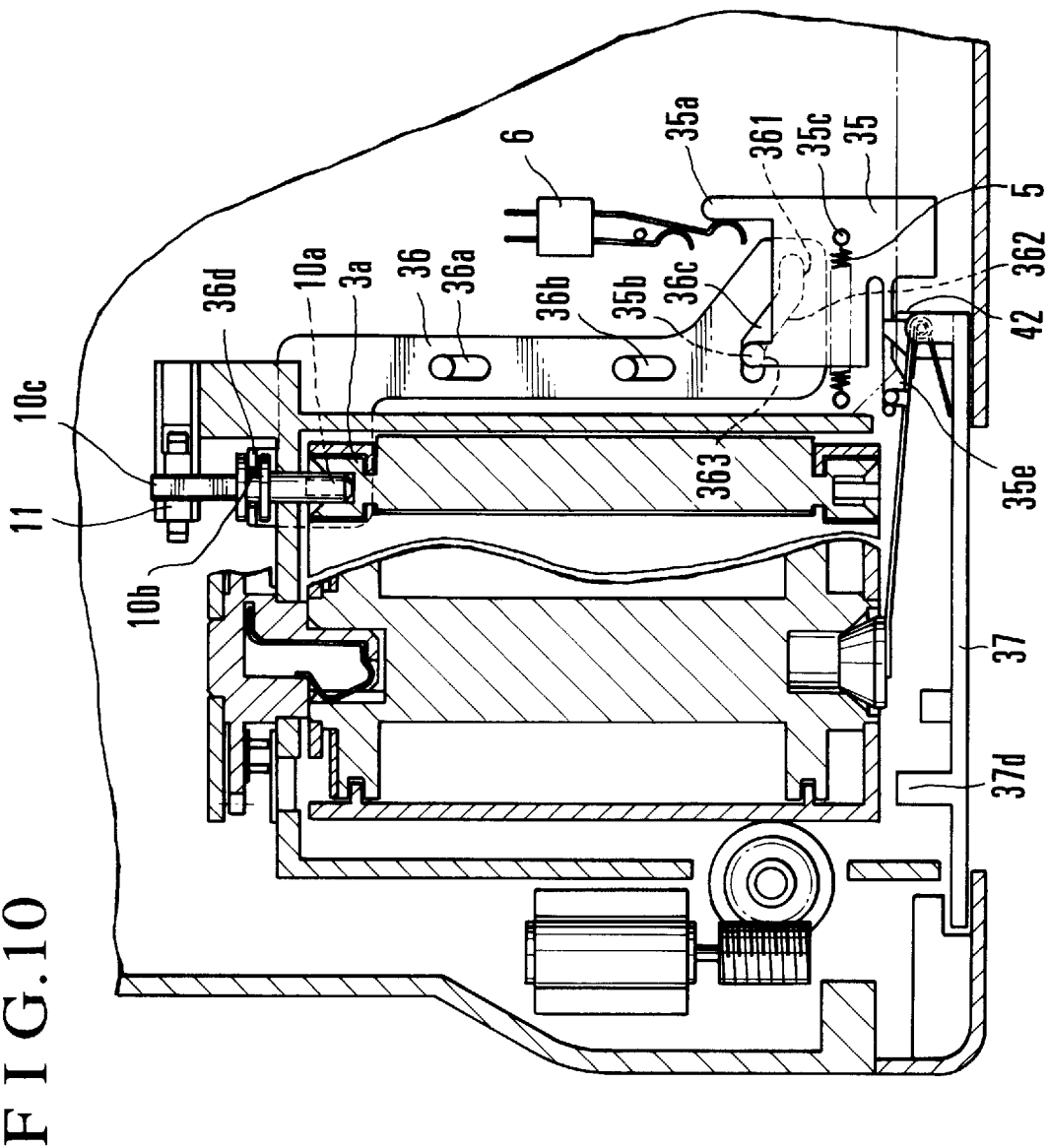
FIG. 10 is a front sectional view showing the camera in a state obtained when the interlocking member has been slid from its position shown in FIG. 9.

FIGS. 9 and 10 show the interlocked states of an interlocking member 35, a cam plate 36 and the driving member 10, corresponding to the actions of a sliding type cartridge chamber lid 37. FIGS. 11 to 17 show only the interlocked actions of the cartridge chamber lid 37, the interlocking member 35, the cam plate 36 and the switch 6. FIGS. 18 to 21 show only the actions of the cartridge chamber lid 37 and a pushing member 38.

Referring to FIGS. 9 to 21, the interlocking member 35 is arranged to be slidable right and left. The slidable extent of the interlocking member 35 is limited within a range shown in FIGS. 11 to 15. The arrangement for slidably carrying the interlocking member 35 and how the slidable extent is restricted are omitted from these illustrations. The interlocking member 35 has a projection 35a, which is arranged to push a contact piece 6a of the switch 6 to be brought into contact with a contact piece 6b when the cam plate 36 is completely moved down with a shaft 35b of the interlocking member 35 having reached a cam face 363 of a cam slot 36c after the interlocking member 35 is slid to the left. With the contact piece 6a pushed, the switch 6 outputs a signal indicating that the driving member 10 has been inserted into the engaging part 3a of the door 3, in the same manner as in the first embodiment described above.

A shaft 35c is provided for hooking the spring 5 between the interlocking member 35 and a shaft 21a of the camera body. The spring 5 is arranged to constantly urge the interlocking member 35 to move to the left. An end face 35d of the interlocking member 35 is arranged to abut on a projection 37a of the cartridge chamber lid 37 while the cartridge chamber lid 37 is being opened. The interlocking member 35 is thus moved to the right against the force of the spring 5 by the driving force of a motor used to open the cartridge chamber lid 37. A lock part 35e of the interlocking member 35 is arranged to override a stopper member 42 secured to the camera body while the interlocking member 35 is moving to the right. While the cartridge chamber lid 37 is in process of being closed by a driving action or the like, the lock part 35e engages the stopper member 42 secured to the camera body. After the cartridge chamber lid 37 is closed, a shaft 35f of the interlocking member 35 extending forward from the paper surface of the drawing is lifted up by a slanting face 37b of the cartridge chamber lid 37 in an extra portion of stroke of the closing. The lock part 35e then unlocks to allow the interlocking member 35 to be moved by the spring 5 so as to bring about a state shown in FIG. 15.

The cam plate 36 is provided with slots 36a and 36b as well as the cam slot 36c and is slidable upward and downward through shafts 8 and 9 provided on the camera body and the slots 36a and 36b. The cam slot 36c has cam faces 361, 362 and 363. The cam plate 36 is further provided with an engaging part 36d which is arranged in an upper part of the cam plate 36 to vertically move the driving member 10. The sliding type cartridge chamber lid 37 is arranged to be driven to move to the right and left for opening and closing a cartridge chamber by a drive source (a motor or the like) which is not shown. The cartridge chamber lid 37 is provided with the spring charging projection 37a and the slanting face 37b for unlocking the lock part 35e, as mentioned above, and also with a support part 37c. The support part 37c is arranged to support a rotation shaft 41 of an arm member 39 for the pushing member 38. The pushing member 38 is rotatably mounted on one end of the arm member 39 located opposite to the other end where the rotation shaft 41 is located. The pushing member 38 is thus arranged to push the spool 2 against the fork gear 15 or to retract it from the fork gear 15 through a swinging motion of the arm member 39. A spring 40 is arranged to constantly urge the arm member 39 clockwise with respect to the cartridge chamber lid 37. The force of the spring 40 for pushing the spool 2 is set to be about the same as the force of the spring 32 in the first embodiment described in the foregoing.

The arm member 39 is provided with a shaft 39a which extends forward from the paper surface of the drawing. The shaft 39a is arranged such that, while the cartridge chamber lid 37 is in process of opening, a cam face 44 which comes to abut on the shaft 39a brings about a counterclockwise swing of the shaft 39a to retract the pushing member 38 from the spool 2. The cartridge chamber lid 37 has, in the same manner as the first embodiment, a stopper face 37d which stops the whole film cartridge 1 from moving downward when the engaging part 3a of the door 3 of the film cartridge 1 is unlocked by the driving member 10. After the lock member 33 is unlocked from the engaging part 3a by the driving member 10, the spring 40 acts to cause the pushing member 38 again to push the film cartridge 1 against the fork gear 15.

The second embodiment which is arranged as described above operates as follows:

FIG. 9 shows a state obtained immediately after the end of an extra stroke made when the cartridge chamber lid 37 is completely closed by a motor which is not shown after the roller 27 is driven by the motor 24 to pull in the film cartridge 1. In this state, since the shaft 39a of the arm member 39 is away from the cam face 44, the pushing member 38 is caused by the spring 40 to push the spool 2 upward.

Further, in the state of FIG. 9, the projection which has the slanting face 37b pushes up the shaft 35f of the interlocking member 35. As a result, the lock part 35e of the interlocking member 35 is disengaged from the stopper member 42. Then, since the interlocking member 35 is being urged leftward by the spring 5, the state of FIG. 9 shifts to a state shown in FIG. 10. The leftward motion of the interlocking member 35 then causes the cam plate 36 to move downward. As a result, the driving member 10 comes to engage the engaging part 3a of the door 3. At the same time, the projection 35a turns on the switch 6 to cause the gear 11 to rotate, thereby opening the film taking-out door 3, in the same manner as in the case of the first embodiment described in the foregoing.

Figure 11:
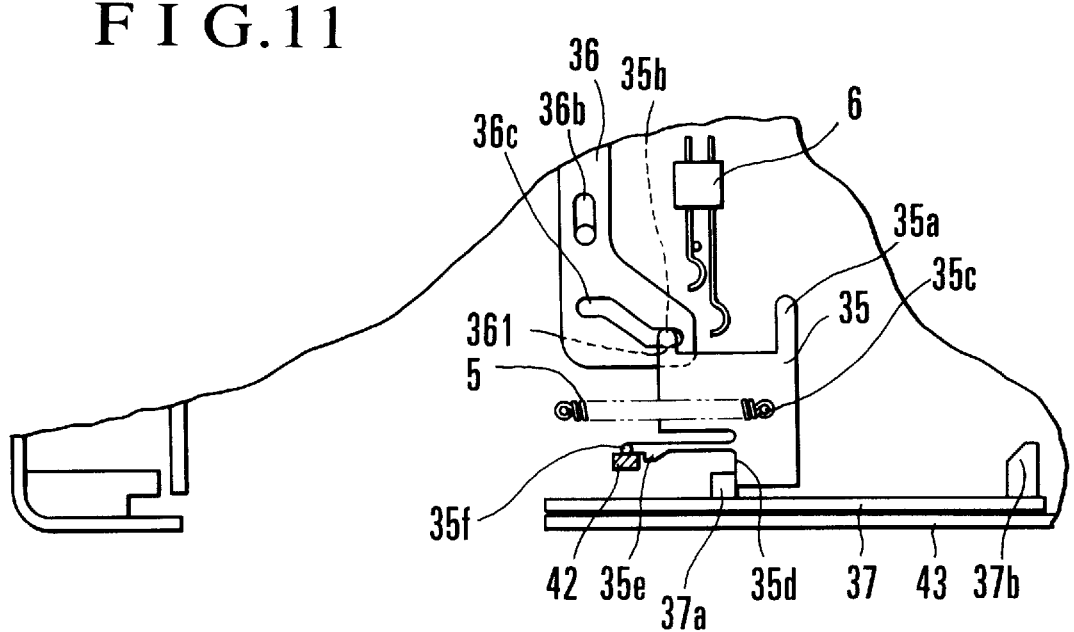
FIG. 11 is a front view showing the cartridge chamber lid of FIG. 9 in an open state.

FIGS. 11 to 17 show the motion of the cartridge chamber lid 37 and that of the interlocking member 35, without showing other members for ease of understanding. FIG. 11 shows a state in which the cartridge chamber lid 37 is in an "open" state. The interlocking member 35 is in a state of being overcharged to the furthest right end by the projection 37a against the force of the spring 5. The cam plate 36 is of course in a raised position. The driving member 10 has been retracted from the cartridge chamber. When the camera is loaded with the film cartridge 1 in the state of FIG. 11, therefore, the film cartridge 1 can be readily pulled inward by the roller 27.

Figure 12:
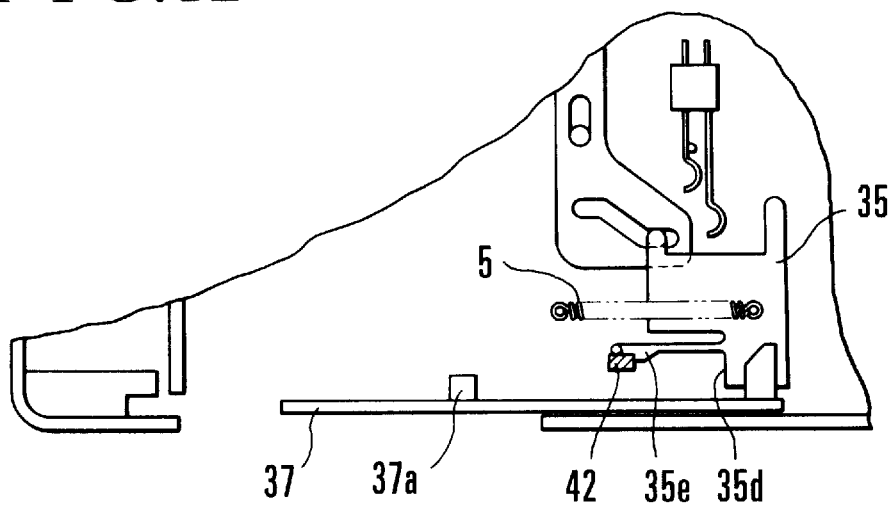
FIG. 12 is a front view showing the cartridge chamber lid in a state of being closed halfway from its full open position shown in FIG. 11.
Figure 13:
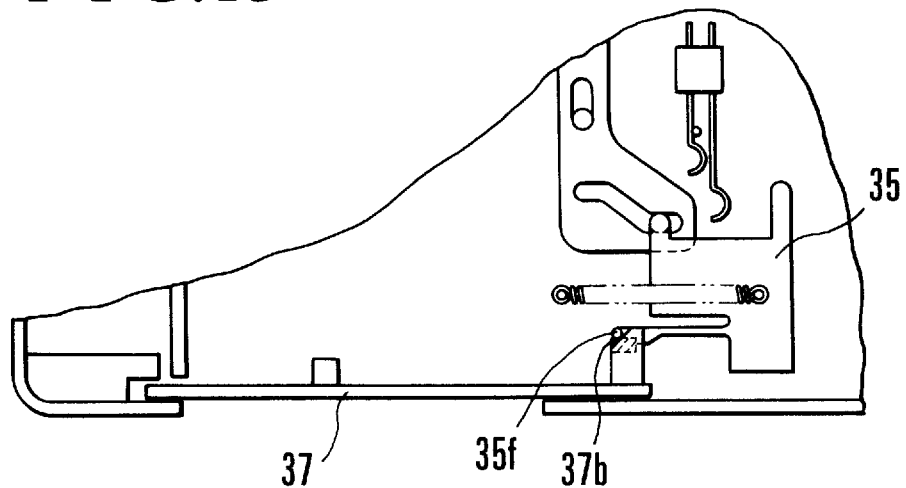
FIG. 13 is a front view showing the cartridge chamber lid in a state of having been almost fully closed from the state shown in FIG. 12.
Figure 14:
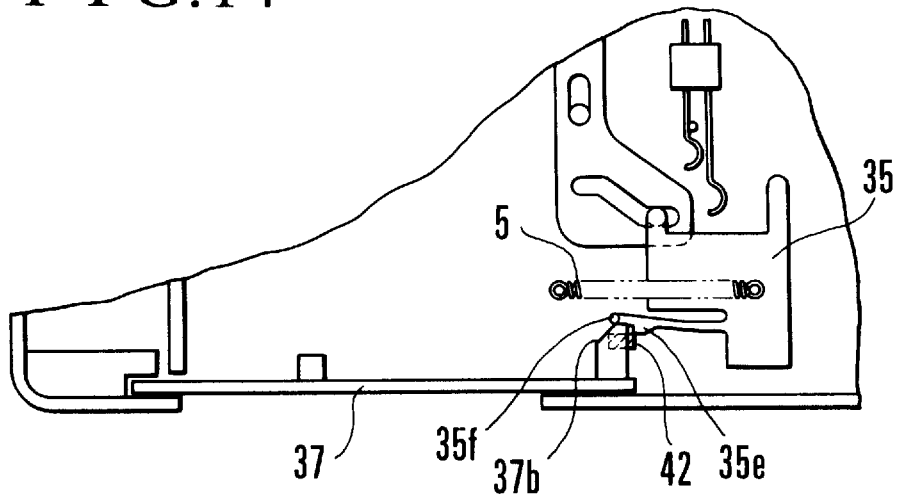
FIG. 14 is a front view showing the cartridge chamber lid in a state of having been closed further from the state shown in FIG. 13.

FIG. 12 shows a state obtained after the film cartridge 1 has been completely pulled in. When a motor which is not shown is driven to move the cartridge chamber lid 37 to the left, i.e., in the direction of closing, the interlocking member 35 is freed from restriction imposed by the projection 37a and is allowed to be moved to the left by the spring 5 until the interlocking member 35 comes to a stop with the lock part 35e coming to abut on the stopper member 42. As the cartridge chamber lid 37 is further moved to the left, the shaft 35f comes to abut on the slanting face 37b as shown in FIG. 13. Upon completion of the closing action on the cartridge chamber lid 37, a light-shielding state of the cartridge chamber is ensured. When the cartridge chamber lid 37 is moved further to the left, as the cartridge chamber lid 37 is still movable to an extra extent, the slanting face 37b pushes up the shaft 35f to disengage the stopper member 42 and the lock part 35e from each other as shown in FIG. 14. At a result, the interlocking member 35 is moved by the spring 5, and a slide restricting part which is not shown brings about a state shown in FIG. 15.

Figure 15:
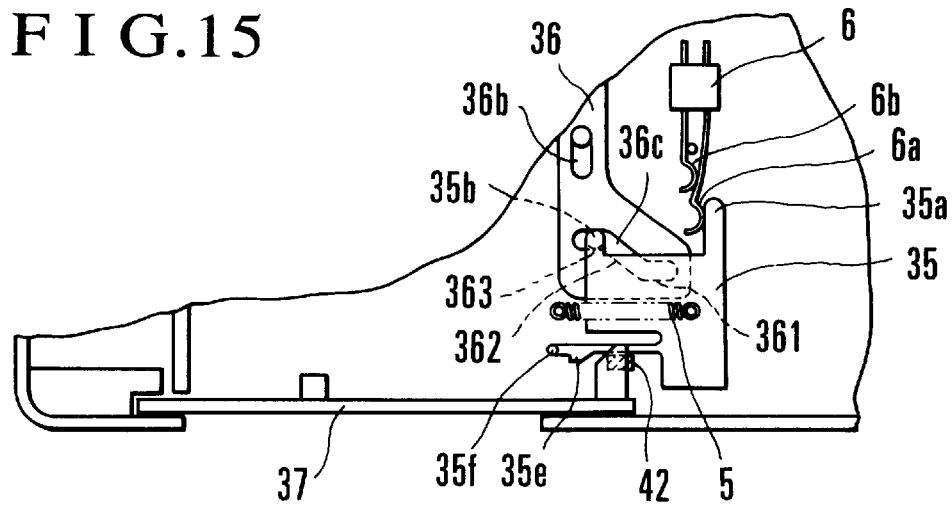
FIG. 15 is a front view showing a state obtained with a switch turned on after the state shown in FIG. 14.

In the state of FIG. 15, the downward motion of the cam plate 36 which results from the leftward motion of the interlocking member 35 causes the driving member 10 to engage the engaging part 3a of the door 3. At the same time, the switch 6 is turned on by the projection 35a. As a result, the driving member 10 opens the door 3 to make the camera ready for ordinary photographing.

Figure 16:
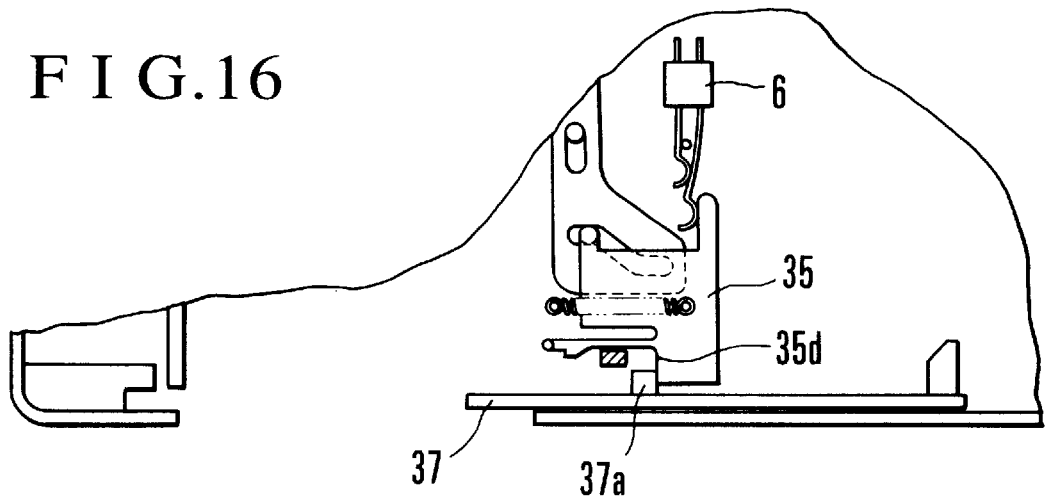
FIG. 16 is a front view showing the camera in a state obtained with the cartridge chamber lid opened from the state shown in FIG. 15.
Figure 17:
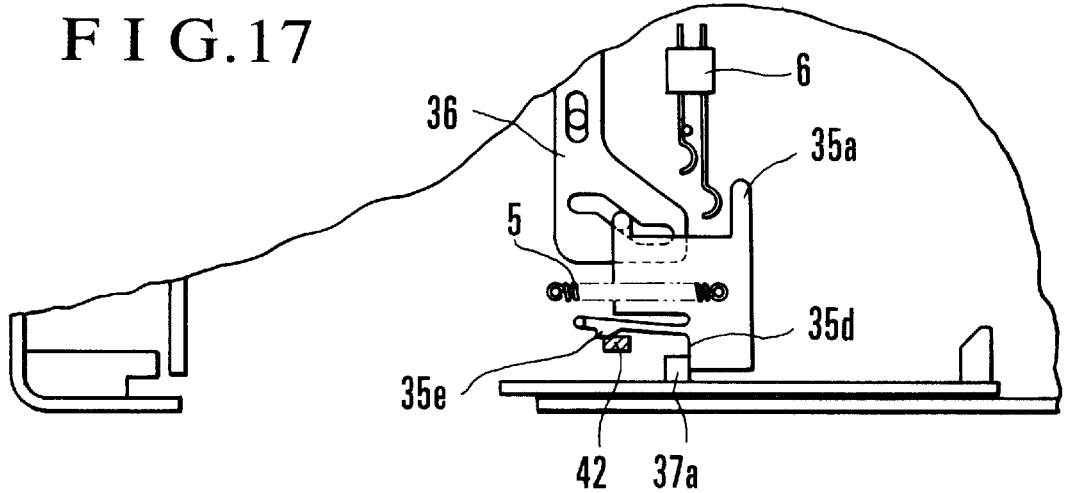
FIG. 17 is a front view showing the camera in a state obtained with the interlocking member retracted from its position shown in FIG. 16.

When the user of the camera pushes an opening-and-closing button (not shown) to open the cartridge chamber lid 37 for taking out the film cartridge 1 after completion of photographing and rewinding of film, the cartridge chamber lid 37 is driven to move to the right after the door 3 is closed by the driving member 10, as shown in FIG. 16. Since, at that time, the interlocking member 35 is urged to move to the left by the spring 5, the interlocking member 35 remains in its position shown in FIG. 15. However, the interlocking member 35 is allowed to move to the left as the cartridge chamber lid 37 is caused to slide as shown in FIG. 17 after the projection 37a has abutted on the end face 35d as shown in FIG. 16. In the state of FIG. 17, the lock part 35e of the interlocking member 35 is caused to override the stopper member 42 by the movement of the cartridge chamber lid 37. When the cartridge chamber lid 37 is further opened to its position shown in FIG. 11, the lock part 35e is again set in its position as shown in FIG. 11. A sequence of actions then comes to an end.

Figure 18:
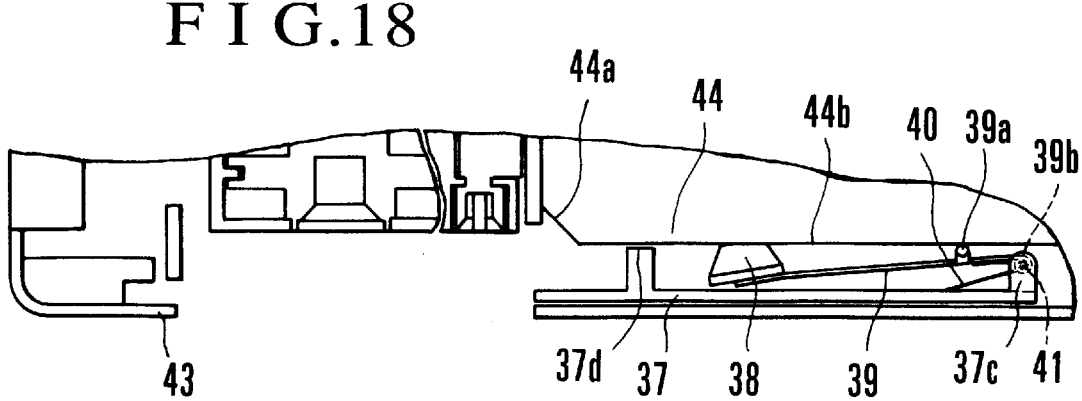
FIG. 18 is an enlarged partial view showing the cartridge chamber lid in a full open position.
Figure 19:
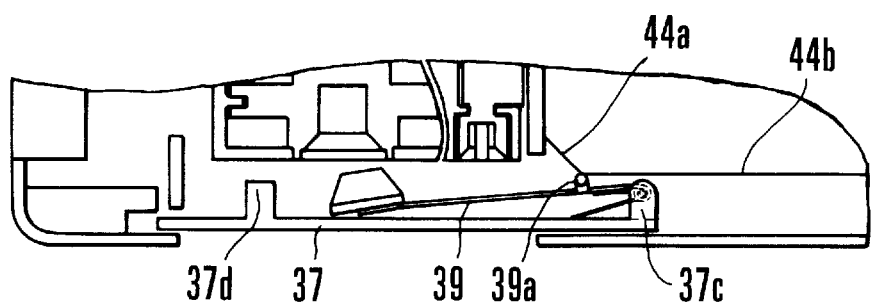
FIG. 19 is an enlarged partial view showing the cartridge chamber lid in a state obtained with the lid closed from its state shown in FIG. 18.

FIGS. 18 to 21 show the motions of the cartridge chamber lid 37, the pushing member 38 and the arm member 39. FIG. 18 shows the cartridge chamber lid 37 as in a state of having been completely opened. Since the motion of the shaft 39a of the arm member 39 is restricted by the cam face 44b, the pushing member 38 is swung counterclockwise against the force of the spring 40 to a retracted position. The film cartridge 1 is completely pulled in by the roller 27, and the camera is thus loaded with the film cartridge 1.

Figure 20:
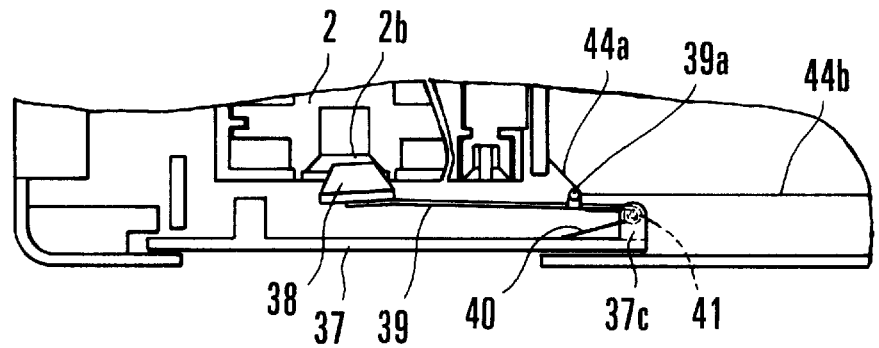
FIG. 20 is an enlarged partial view showing the camera in a state of pushing up a film take-up spool with a pushing member from its state of FIG. 19.
Figure 21:
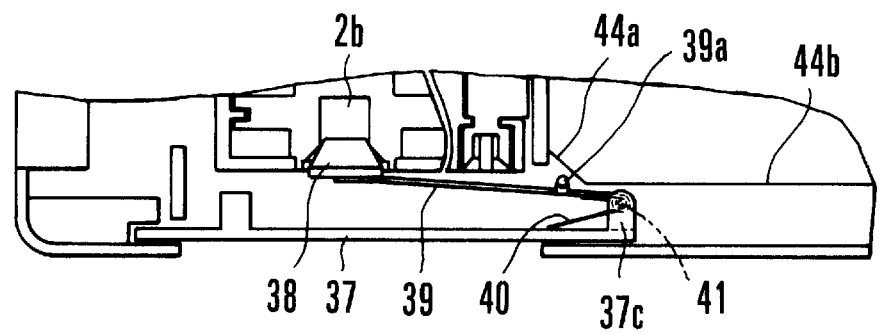
FIG. 21 is an enlarged partial view showing the camera in a state of having the film take-up spool fitted into a fit engaging part from its position shown in FIG. 20.

Upon completion of loading, a motor which is not shown is driven to cause the cartridge chamber lid 37 to move in the direction of closing. The state of FIG. 19 shifts to a state shown in FIG. 20. FIG. 20 shows the film cartridge 1 as in a state of being temporarily loaded, with the pushing member 38 only slightly pushing the spool 2 since the shaft 39a of the arm member 39 has moved from the cam face 44b to the cam face 44a. Under this condition, the cartridge chamber lid 37 is closed to completely block light and is in the same position as the position shown in FIG. 13. When the cartridge chamber lid 37 is further slid to the extra extent, the shaft 39a of the arm member 39 is completely detached from the cam face 44a, and the pushing member 38 comes to the center of the spool 2 to stably push the spool 2. The motor is brought to a stop when the moving action of the cartridge chamber lid 37 comes to an end.

(Third Embodiment)

FIGS. 22 to 27 show the operation of a third embodiment of this invention. The third embodiment is arranged in the same manner as the second embodiment except the following points: There is provided an interlocking member 45 as if the interlocking member 35 is not urged by any spring and not provided with any lock part. A slanting face 46a and a long flat receiving face 46b are provided correspondingly with the cartridge stopper face 37d of the cartridge chamber lid 37. All parts arranged in the same manner as the first and second embodiments are indicated by the same reference numerals.

Figure 24:
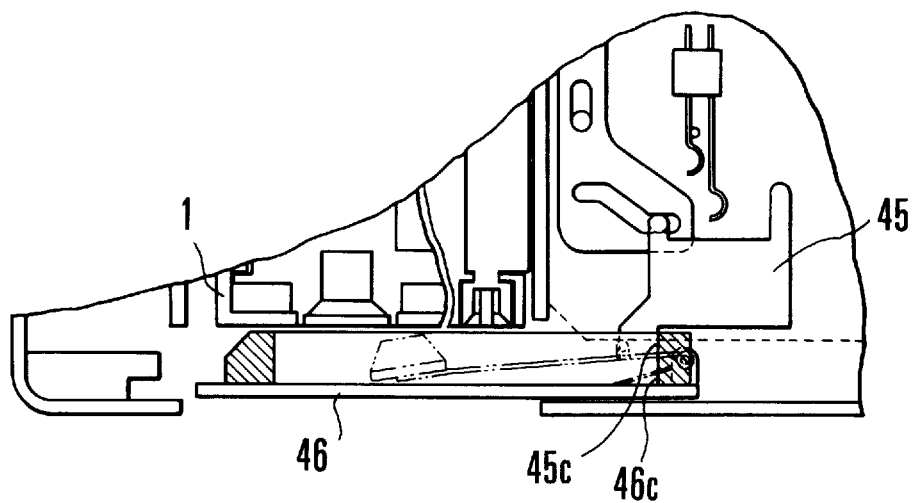
FIG. 24 is an enlarged partial view showing the sliding lid in a state of being closed further from its position shown in FIG. 23.
Figure 27:
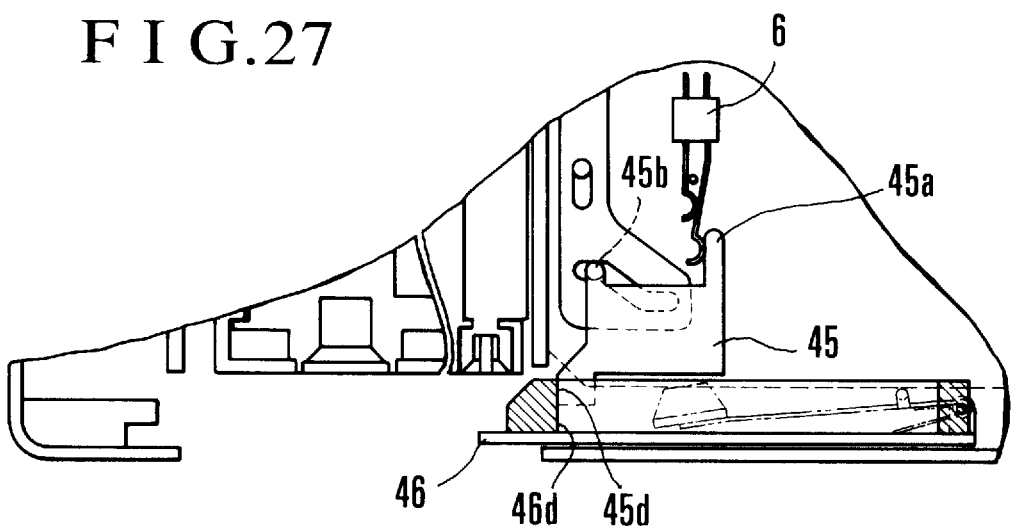
FIG. 27 is an enlarged partial view showing the camera in a state of having an opening-interlocking face abutting on an interlocking member while the sliding lid is opening from its closed position shown in FIG. 22.

In other words, the use of the slanting face 37b for freeing the interlocking member 35 is not used while a closing interlocking face 46c and an opening interlocking face 46d are added. In closing a sliding lid 46, the closing interlocking face 46c abuts on a face 45c of the interlocking member 45 as shown in FIG. 24. When the sliding lid 46 is further closed, the interlocking member 45 comes to slide to the left in association with the movement of the sliding lid 46. Conversely, in opening the sliding lid 46 from its closed state, the opening interlocking face 46d abuts on a face 45d of the interlocking member 45 as shown in FIG. 27. When the sliding lid 46 is further opened, the interlocking member 45 comes to move to the right in association with the movement of the sliding lid 46. The interlocking member 45 is arranged to be slidable to the right or left in the same manner as in the case of the second embodiment and to include a projection 45a which is arranged to turn on and off the switch 6 and a shaft 45b which is fitted into a cam slot 36c of the cam plate 36. The motion of the interlocking member 45 to the right or left is converted into the upward or downward motion of the cam plate 36.

The arm member 39 which is arranged to move back and forth the pushing member 38 for the spool 2 is rotatably supported by a support part 46e and is urged by the spring 40 to swing clockwise. When the sliding lid 46 is open, the pushing member 38 is in its retracted position as the shaft 39a of the arm member 39 is abutting on the cam face 44. When the sliding lid 46 is closed, the pushing member 38 is pushing the spool 2 upward as the shaft 39a stay away from the cam face 44. The arrangement in this point is the same as in the case of the second embodiment.

The third embodiment which is arranged in the above-stated manner operates as follows.

Figure 22:
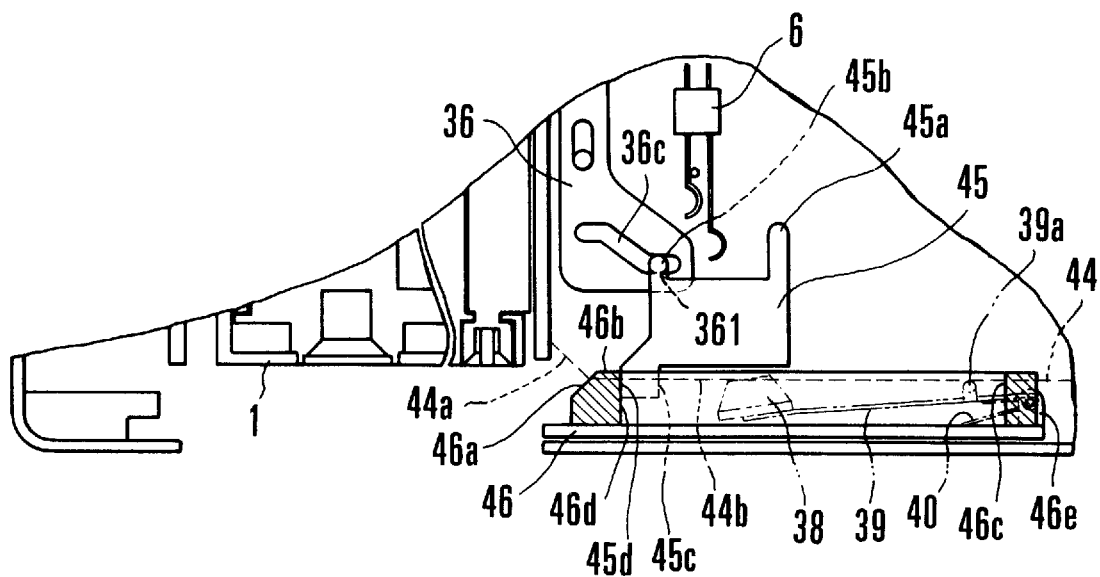
FIG. 22 is an enlarged partial view showing a camera according to a third embodiment of this invention in a state of having a sliding lid in its full open position.

FIG. 22 shows a state in which the sliding lid 46 is open. The opening interlocking face 46d abuts on the face 45d of the interlocking member 45, which is in its furthest position on the right side. The switch 6 is in an off-state. The cam plate 36 is in its highest position. In this state, the driving member 10 is in a retracted position where the driving member 10 does not engage the film cartridge 1 when the film cartridge 1 is loaded. The motor-driven action of pulling the film cartridge 1 inward by the roller 27, therefore, can be performed under a small load, so that the loading action can be smoothly carried out. Upon completion of the loading action on the film cartridge 1, a data disk plate 23 is detected by the photo-reflectors 19a and 19b, and the sliding lid 46 is driven to close.

Figure 23:
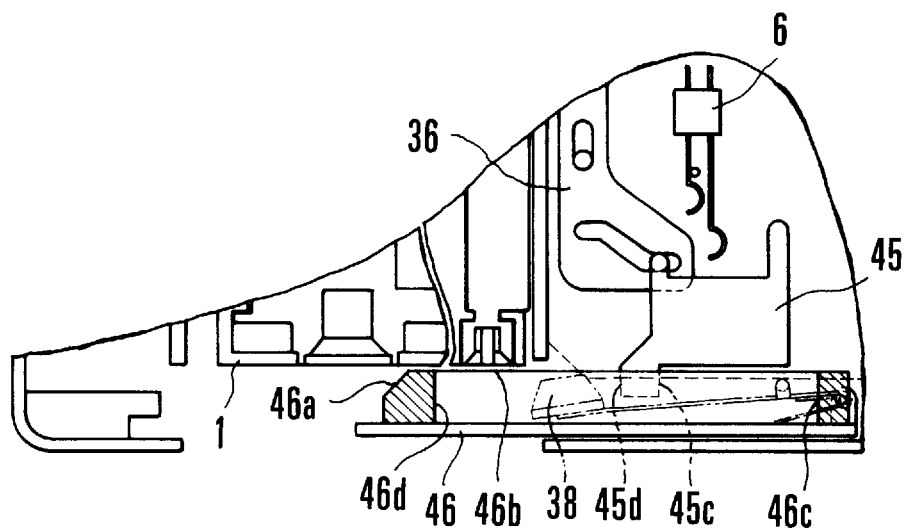
FIG. 23 is an enlarged partial view showing the same sliding lid in a state of being closed to a small extent from its position shown in FIG. 22.
Figure 25:
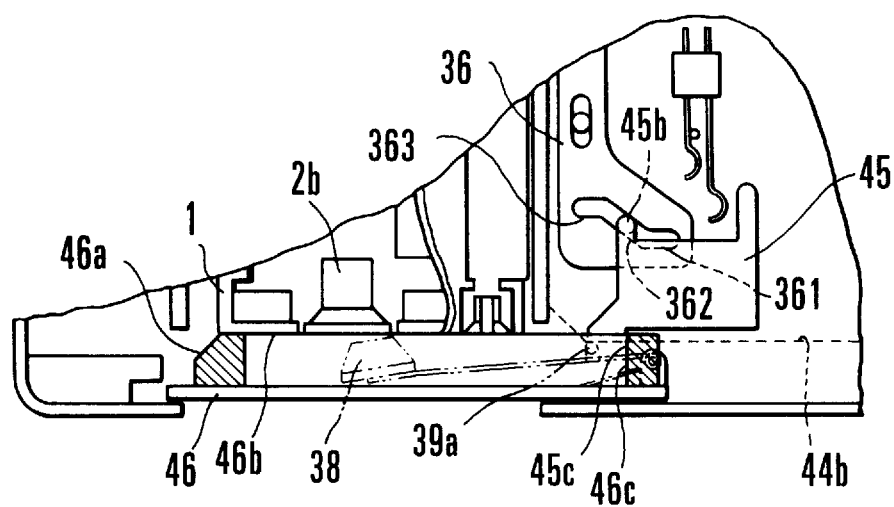
FIG. 25 is an enlarged partial view showing the sliding lid in a state of being closed still further from its position shown in FIG. 24.

FIG. 23 shows a state obtained when the sliding lid 46 is in process of closing. However, since the interlocking member 45 is not urged by any spring, unlike the second embodiment, the interlocking member 45 remains in its position shown in FIG. 22. When the sliding lid 46 is further closed, the closing interlocking face 46c comes to abut on the face 45c as shown in FIG. 24. When the sliding lid 46 moves further in the direction of closing (to the left) from the state shown in FIG. 24, the interlocking member 45 begins to move in association with the sliding lid 46 as shown in FIG. 25. FIG. 25 shows a state obtained with the interlocking member 45 moved by the sliding lid 46. The switch 6 still remains in its off-state. Since the shaft 39a is abutting on the cam face 44b, the pushing member 38 for the spool 2 is in its retracted position. However, since the interlocking member 45 has been slid about one half of its slidable range, the cam plate 36 has been moved down about one half of its movable range by the shaft 45b to the position of the cam face 363. Therefore, the driving member 10 also has been moved down about one half of its full stroke. However, since the pushing member 38 is not pushing the spool 2, the whole film cartridge 1 is pushed down by the driving member 10 with the driving member 10 in a state of being unable to release the lock member 33 of the door 3.

However, since there is provided the receiving face 46b for receiving the film cartridge 1, the film cartridge 1 is not allowed to move downward from its position shown in FIG. 25. With the sliding lid 46 moved further in the direction of closing, when there is obtained a state shown in FIG. 26, the driving member 10 comes to push out the lock member 33 and engages the engaging part 3a of the door 3 in the same manner as in the case of the first embodiment described in the foregoing. The downward urging force of the driving member 10 then disappears, and the shaft 39a of the arm member 39 moves away from the cam faces 44a and 44b. As a result, the spring 40 causes the pushing member 38 to push the spool 2 of the film cartridge 1 upward. The film cartridge 1 again comes to abut on the fork gear 15 and is thus duly set in position.

Figure 26:
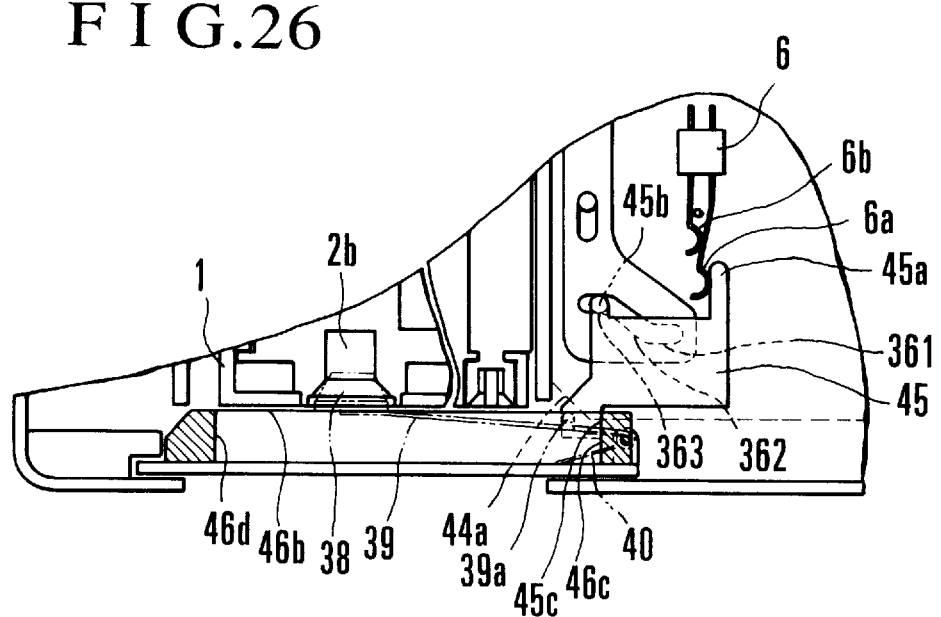
FIG. 26 is an enlarged partial view showing the sliding lid in a state of having been completely closed from its position shown in FIG. 25.

In the state of FIG. 26, the switch 6 is turned on by the projection 45a of the interlocking member 45 and the camera is in process of a sequence of actions in the same manner as the first and second embodiments. In the case of the third embodiment, however, the sliding lid 46 is arranged to be driven to slide in the direction of closing while having an outside part of the film cartridge 1 pushed against the receiving face 46b when the state of FIG. 25 shifts to the state of FIG. 26. Despite this, the sliding lid 46 can be smoothly driven to slide without frictional contact with any uneven external parts of the film cartridge, by virtue of the slanting face 46a and the receiving face 46b which is sufficiently long.

After the film is completely rewound with a photographing operation on the film having been finished, when a knob (not shown) for operating the cartridge chamber lid is operated, the gear 11 is driven, so that the door 3 provided for putting out the film is closed. After that, the sliding lid 46 is driven to slide in the direction of opening as shown in FIG. 27, and the opening interlocking face 46d is driven in the direction of opening. After the opening interlocking face 46d comes to abut on the face 45d of the interlocking member 45, the interlocking member 45 moves to the right in association with the sliding lid 46 to turn off the switch 6 and to push the cam plate 36 upward. As a result, the driving member 10 is pulled out from the engaging part 3a of the door 3, so that the film cartridge 1 can be ejected with a slight pushing force.

With the sliding lid 46 driven to shift from the position of FIG. 26 to the position of FIG. 27, the shaft 39a of the arm member 39 abuts on the cam faces 44a and 44b to cause the pushing member 38 to be retracted from the spool 2, in the same manner as in the case of the second embodiment. When the sliding lid 46 moves from its position of FIG. 26 in the direction of opening, an urging force of the contact piece 6a of the switch 6 is applied to the projection 45a of the interlocking member 45. Therefore, no problem arises even if the interlocking member 45 moves to the right until the switch 6 is turned off before the opening interlocking face 46d comes to abut on the face 45d of the interlocking member 45.

(Fourth Embodiment)

FIGS. 28 to 31 show a fourth embodiment of this invention. The fourth embodiment differs from others described in the foregoing in the following point. The position of the driving member is driven to be shifted from a retracted position to an engaging position in response to a signal indicative of completion of a locking action on a cartridge chamber lid 58. In FIGS. 28 to 31, all parts of the fourth embodiment that are arranged in the same manner as those of other embodiments are indicated by the same reference numerals.

Figure 28:
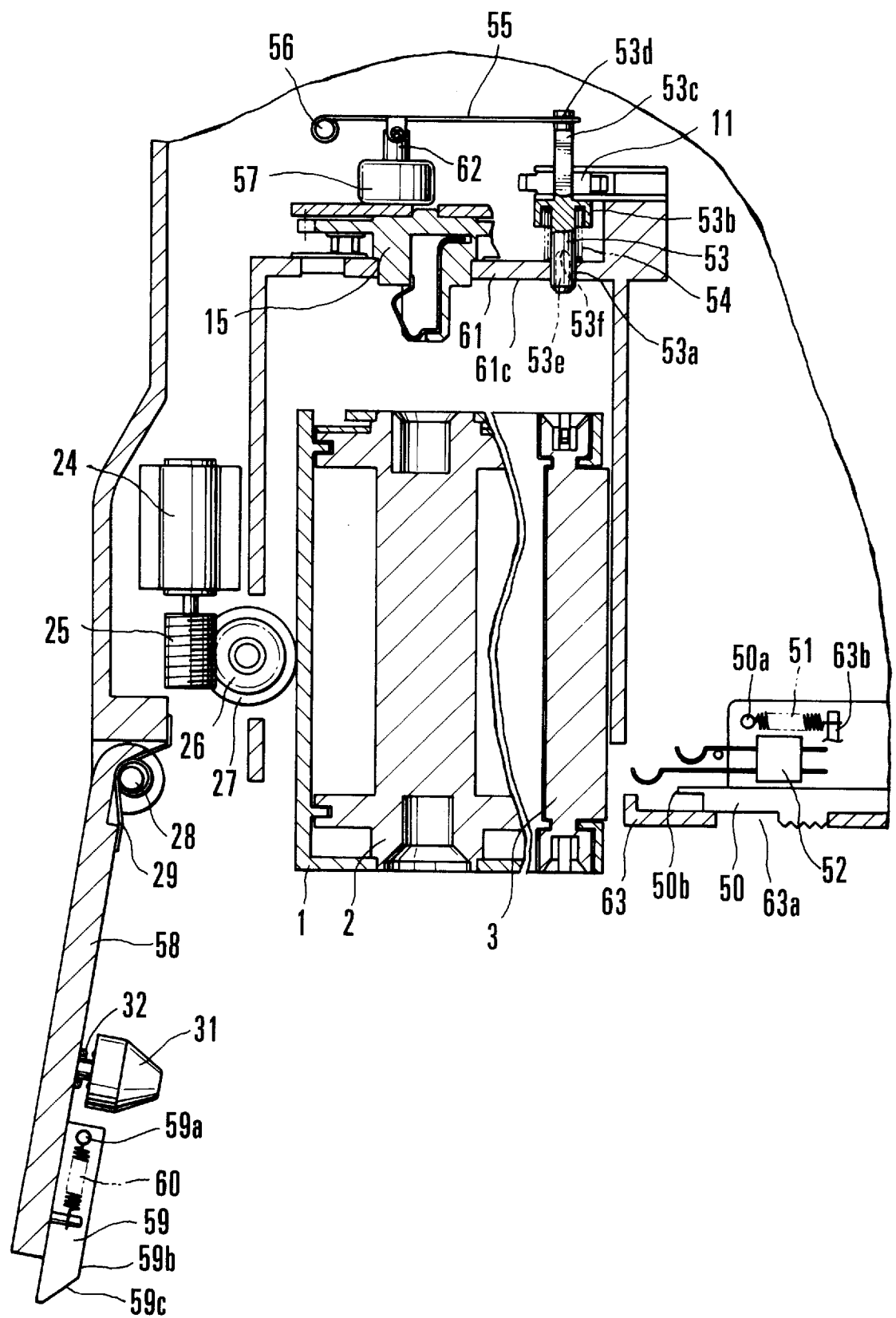
FIG. 28 is a front sectional view showing a camera according to a fourth embodiment of this invention in a state obtained while the camera is in process of being loaded with a film cartridge by opening a cartridge chamber lid and driving a roller.
Figure 29:
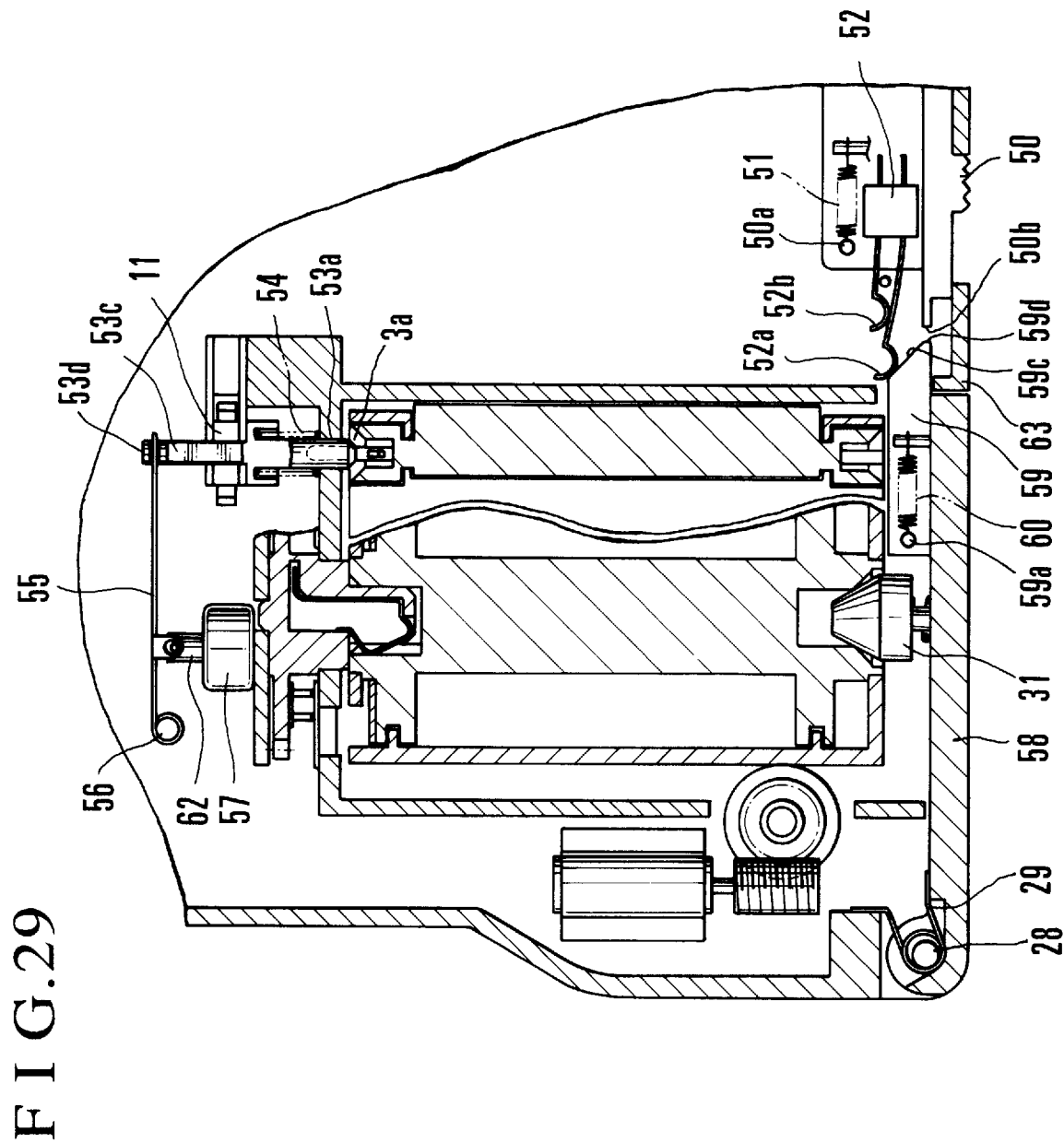
FIG. 29 is a front sectional view showing the cartridge chamber lid in a closed position with the loading of the cartridge completed after the state shown in FIG. 28.
Figure 30:
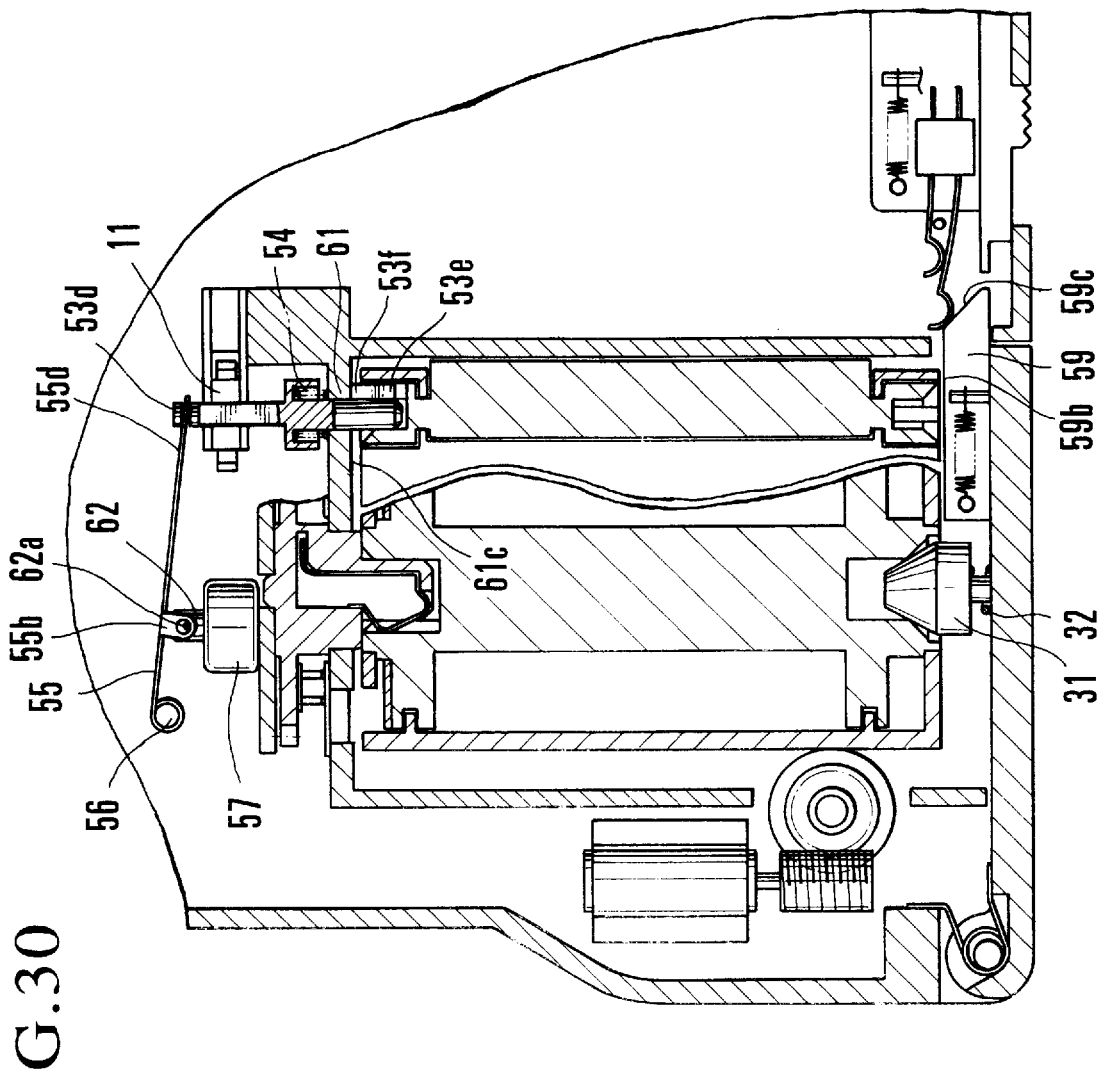
FIG. 30 is a front sectional view showing the camera in a state obtained when a spring fitted on a fit engaging part is charged by causing a gear to rotate after the state shown in FIG. 29.
Figure 31:
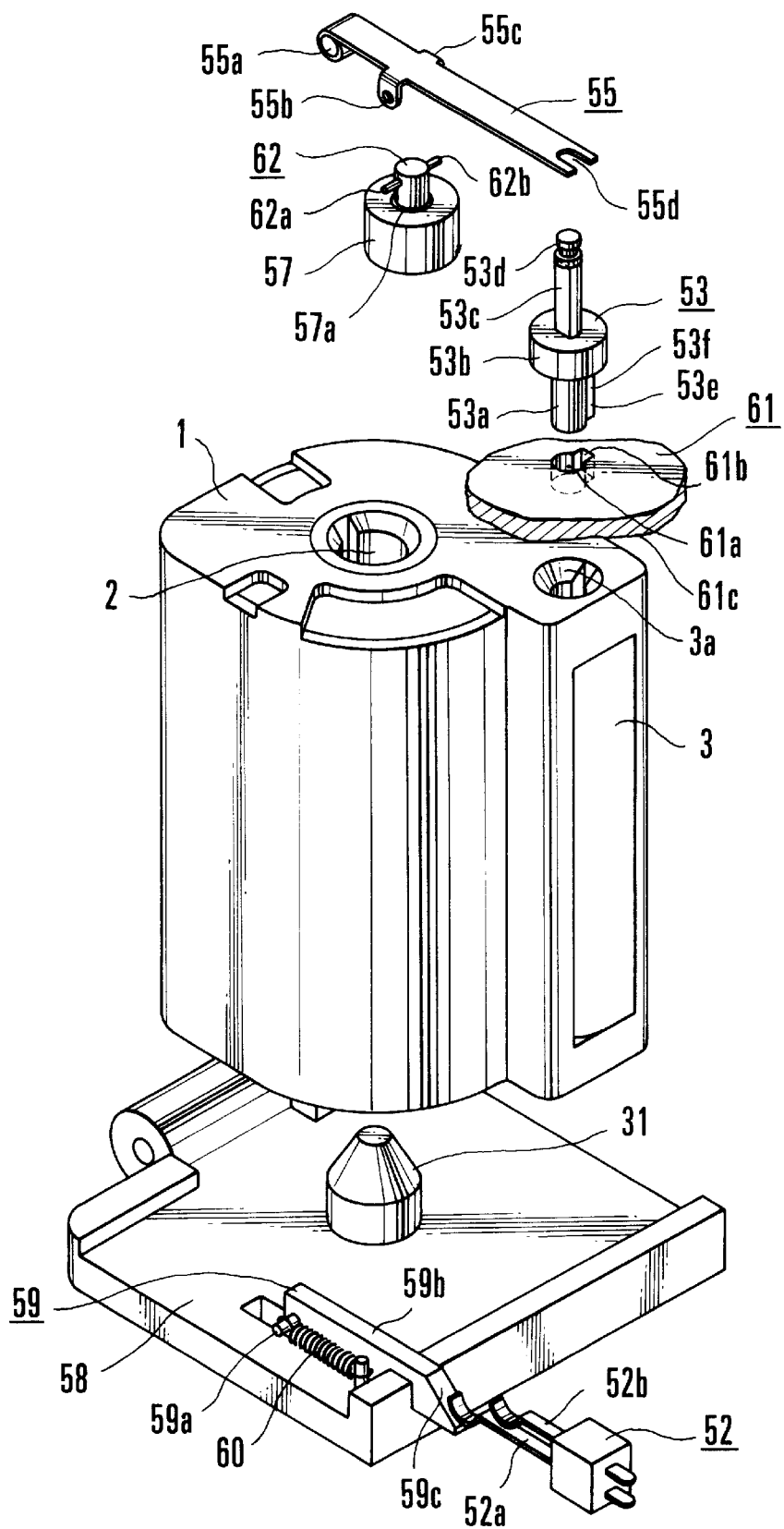
FIG. 31 is an exploded oblique view showing the arrangement of essential parts of the fourth embodiment.

Referring to FIGS. 28 to 31, an opening-and-closing knob 50 is arranged to be slidable within a range defined by a hole (aperture) 63a provided in a cover 63 and to be constantly urged to slide to the right by a spring 51. When the cartridge chamber lid 58 is in a closed state as shown in FIGS. 29 and 30, if the opening-and-closing knob 50 is moved to the left, i.e., in the direction of opening, a fore end part 50b of the opening-and-closing knob 50 pushes a fore end part 59d of a lock claw 59. With the knob 50 moved further to the left, the lock claw 59 is retracted from the cover 63 to unlock the cartridge chamber lid 58, so that the cartridge chamber lid 58 can be opened.

When the lock claw 59 is in a locking state as shown in FIGS. 29 and 30, a switch 52 has its contact piece 52a pushed up by a slanting face 59c of the lock claw 59 into contact with another contact piece 52b. With the contacts pieces 52a and 52b coming into contact with each other, a signal indicating that the cartridge chamber lid 58 has been locked is supplied to a control IC of the camera. A driving member 53 is arranged to open and close the film putting-out door 3 by engaging the engaging part 3a of the door 3. A spring 54 is arranged to constantly urge the driving member 53 to move upward. The driving member 53 is provided with a fit engaging part 53a for fit engagement with the engaging part 3a of the door 3, an upper stopper part 53b which serves also as a spring peg, and a gear 11. The gear 11 is arranged to cause the driving member 53 to rotate a predetermined angle either at a position in which the driving member 53 engages the film cartridge 1 and at a position in which the driving member 53 is away from the film cartridge 1. The gear 11 and the driving member 53 are fittingly engaging each other in a "D" sectional shape, in the same manner as in the case of each of the first, second and third embodiments.

A hooking part 53d is formed at the uppermost part of the driving member 53. The hooking part 53d engages a U-shaped engaging part 55d formed at the fore end of a leaf spring 55 which is arranged to be swingable on a shaft 56 secured to the camera body 61. When a plunger 57 is energized, a shaft 62 moves downward. Since pins 62a and 62b of the shaft 62 are hooked on hooking parts 55b and 55c of the leaf spring 55, the downward motion of the shaft 62 causes the leaf spring 55 to swing clockwise on the shaft 56. The clockwise swing of the leaf spring 55 causes the engaging part 55d to push down the hooking part 53d of the driving member 53. The driving member 53 then comes down against the force of the spring 54 to engage the engaging part 3a of the door 3. The driving member 53 is provided with a projection 53e at the fit engaging part 53a. When the driving member 53 engages the engaging part 3a of the door 3, the projection 53e transmits the rotation of the driving member 53 to the door 3.

The camera body 61 is provided with a hole 61a for having the fit engaging part 53a of the driving member 53 fitted therein and also a key way 61b for escaping the projection 53e. The door 3 is made to open when the gear 11 is driven after the driving member 53 is pushed down with the leaf spring 55 swung by the plunger 57. At this time, the phase of the projection 53e of the driving member 53 differs from the phase of the key way 61b of the camera body 61. Therefore, when the door 3 is opened, the urging force of the spring 54 is retained, even after the plunger 57 is deenergized, by the abutment of an upper round part 53f of the projection 53e on a face 61c which is located within the cartridge chamber of the camera body 61. Further, when the door 3 is closed with the driving member 53 returned, the phase of the key way 61b comes to coincide with that of the projection 53e. Therefore, the urging force of the spring 54 serves to automatically retract the driving member 53 from the engaging part 3a of the door 3. To make the projection 53e readily rotatable even under the urging force of the spring 54, the upper round part 53f of the projection 53e is in a round shape. Such a round shape enables the projection 53e to smoothly fit into the key way 61b when the door 3 is closed.

The fourth embodiment which is arranged in the manner as described above operates as follows.

FIG. 28 shows the camera in process of being loaded with the film cartridge 1 by driving the roller 27 with the cartridge chamber lid 58 having been opened. The driving member 53 has been retracted by the spring 54 from the cartridge chamber. Therefore, in loading the film cartridge 1 by using the roller 27, the film cartridge 1 can be mounted with a very small force, because a load on the film cartridge loading action consists of only a load of engagement with the fork gear 15 and a frictional force developed with the film cartridge 1 pushed against the cartridge chamber of the camera body 61.

Upon completion of loading the camera with the film cartridge 1, the cartridge chamber lid 58 is closed as shown in FIG. 29. The slanting face 59c of the lock claw 59 abuts on the cover 63 and the lock claw 59 is temporarily moved to the left against the force of the spring 60. When the cartridge chamber lid 58 is closed up to its position shown in FIG. 29, the lock claw 59 is again moved to the right by the spring 60 to bring the cartridge chamber lid 58 into a locked state. In this instance, the rightward motion of the lock claw 59 pushes up the contact piece 52a of the switch 52 into contact with the other contact piece 52b. Then, a signal indicating that the cartridge chamber lid 58 has been locked is supplied from the switch 52 to the control IC. As a result, the plunger 57 begins to be energized. The leaf spring 55 is swung clockwise to cause the driving member 53 to engage the engaging part 3a of the door 3. Then, the gear 11 is caused to rotate a predetermined angle to open the door 3, as shown in FIG. 30. The phase of the upper round part 53f of the projection 53e of the driving member 53 becomes different from that of the key way 61b formed in the camera body 61. The projection 53e thus comes to abut on the face 61c of the camera body 61. Therefore, even when the plunger 57 is deenergized, the state of FIG. 30 in which the spring 54 is charged can be maintained.

While each of the embodiments described above is arranged to load and eject the film cartridge from the lower part of the camera, this invention is not limited to this loading and ejecting arrangement. For example, in accordance with this invention, the camera may be arranged to load and eject the film cartridge either from above or from one side of the camera.

While each of the embodiments described is arranged to axially load and eject the film cartridge, this invention is not limited to the axial loading and ejecting arrangement.

This invention applies not only to the cameras adapted for use of the film cartridge having the movable light-blocking door of the kind described in the foregoing or the like but also to cameras adapted for use of film cartridges having movable light-blocking doors of kinds other than the above described kind.

This invention is applicable also to image recording media other than a film.

This invention is applicable also to a cartridge of a type other than the type used by each of the embodiments described, to a cartridge containing an image recording medium other than a film, to a cartridge of some other kind and to a matter other than a cartridge, such as a battery which is to be loaded and ejected.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further the individual components shown in schematic or block form in the drawings are all well-known in the camera arts and their specific construction and operation are not critical to the operation or best mode for carrying out the invention.

This invention may be carried out by combining as necessary the embodiments described or their technological elements described in the foregoing.

This invention applies to cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements of these apparatuses and devices.

What is claimed is:

1. An apparatus adapted to a film cartridge having a cartridge cover and an engaging part for driving the cartridge cover, comprising:

a) a first operation device which performs at least one of opening and closing operations of the cartridge by engagement with said engaging part; and
   b) a second operation device which enables said first operation device to advance and retract along an axis of said engaging part.

2. An apparatus according to claim 1, wherein said apparatus includes a camera.

3. An apparatus according to claim 1, wherein said second operation device includes means for enabling said first operation device to advance into and retract from a cartridge chamber in which the cartridge is to be loaded.

4. An apparatus according to claim 1, wherein said second operation device includes means for causing said first operation device to perform one of said advancing and retracting in association with an opening and closing of a cartridge chamber cover.

5. An apparatus according to claim 1, wherein said second operation device includes means for enabling said first operation device to advance in a state where said first operation device engages the cartridge and to retract in a state where said first operation device does not engage the cartridge.

6. An apparatus according to claim 1, wherein said second operation device includes means for setting, in association with a closing operation of a cover of a cartridge chamber in which the cartridge is to be loaded, said first operation device into a state where said first operation device is engageable with the cartridge loaded in the cartridge chamber.

7. An apparatus according to claim 6, further comprising a third operation device for causing said first operation device to perform the opening operation of the cartridge in association with the closing operation of the cover of the cartridge chamber.

8. An apparatus according to claim 6, wherein said second operation device includes means for setting, in association with an opening operation of the cover of the cartridge chamber, said first operation device into a state where said first operation device is released from engaging with the cartridge loaded in the cartridge chamber.

9. An apparatus according to claim 1, further comprising a third operation device for causing said first operation device to perform the opening operation of the cartridge in association with a closing operation of a cover of a cartridge chamber in which the cartridge is to be loaded.

10. An apparatus according to claim 1, wherein said second operation device includes means for setting, in association with an opening operation of a cover of a cartridge chamber in which the cartridge is to be loaded, said first operation device into a state where said first operation device is released from engaging with the cartridge loaded in the cartridge chamber.

11. An apparatus according to claim 10, further comprising a third operation device for causing said first operation device to perform the closing operation of the cartridge in association with the opening operation of the cover of the cartridge chamber.

12. An apparatus according to claim 1, further comprising a third operation device for causing said first operation device to perform the closing operation of the cartridge in association with an opening operation of a cover of a cartridge chamber in which the cartridge is to be loaded.

13. An apparatus according to claim 1, further comprising a third operation device for causing said first operation device to perform at least one of the opening and closing operations of the cartridge in association with an opening and closing of a cartridge chamber cover.

14. An apparatus according to claim 13, wherein said third operation device includes means for motor drive.

15. An apparatus according to claim 1, wherein said second operation device includes means for motor drive.

16. An apparatus according to claim 1, wherein the film cartridge includes an opening and closing cover for taking out the film from the cartridge, as means for making the cartridge openable and closable.

17. An apparatus adapted to a film cartridge having a cartridge cover and an engaging part for driving the cartridge cover, comprising:
   a) a first operation device which performs at least one of opening and closing operations of the cartridge cover by engagement with said engaging part; and
   b) a second operation device which sets said first operation device into a state where said first operation device is engageable with the loaded cartridge, said second operation device being movable along an axis of said engaging part.

18. An apparatus according to claim 17, wherein said apparatus includes a camera.

19. An apparatus according to claim 17, wherein said second operation device includes means for moving said first operation device to a cartridge chamber in which the cartridge is to be loaded.

20. An apparatus according to claim 17, wherein said second operation device includes means for setting, in association with an opening and closing of a cartridge chamber cover, said first operation device into a state where said first operation device is engageable with the loaded cartridge.

21. An apparatus according to claim 17, wherein said second operation device includes means for moving said first operation device to be brought into a state where said first operation device is engageable with the cartridge and a state where said first operation device does not engage the cartridge.

22. An apparatus according to claim 17, wherein said second operation device includes means for setting, in association with a closing operation of a cover of a cartridge chamber in which the cartridge is to be loaded, said first operation device into a state where said first operation device is engageable with the cartridge loaded in the cartridge chamber.

23. An apparatus according to claim 22, further comprising a third operation device for causing said first operation device to perform the opening operation of the cartridge in association with the closing operation of the cover of the cartridge chamber.

24. An apparatus according to claim 22, wherein said second operation device includes means for setting, in association with an opening operation of the cover of the cartridge chamber, said first operation device into a state where said first operation device is released from engaging with the cartridge loaded in the cartridge chamber.

25. An apparatus according to claim 17, further comprising a third operation device for causing said first operation device to perform the opening operation of the cartridge in association with a closing operation of a cover of a cartridge chamber in which the cartridge is to be loaded.

26. An apparatus according to claim 17, wherein said second operation device includes means for setting, in association with an opening operation of a cover of a cartridge chamber in which the cartridge is to be loaded, said first operation device into a state where said first operation device is released from engaging with the cartridge loaded in the cartridge chamber.

27. An apparatus according to claim 26, further comprising a third operation device for causing said first operation device to perform the closing operation of the cartridge in association with the opening operation of the cover of the cartridge chamber.

28. An apparatus according to claim 17, further comprising a third operation device for causing said first operation device to perform the closing operation of the cartridge in association with an opening operation of a cover of a cartridge chamber in which the cartridge is to be loaded.

29. An apparatus according to claim 17, further comprising a third operation device for causing said first operation device to perform at least one of the opening and closing operations of the cartridge in association with an opening and closing of a cartridge chamber cover.

30. An apparatus according to claim 29, wherein said third operation device includes means for motor drive.

31. An apparatus according to claim 17, wherein said second operation device includes means for motor drive.

32. An apparatus according to claim 17, wherein the film cartridge includes an opening and closing cover for taking out the film from the cartridge, as means for making the cartridge openable and closable.

33. An apparatus adapted to an image recording medium cartridge having a cartridge cover and an engaging part for driving the cartridge cover, comprising:
   a) a first operation device which performs at least one of opening and closing of the cartridge cover by engagement with said engaging part; and
   b) a second operation device which enables said first operation device to advance and retract along an axis of said engaging part.

34. An apparatus according to claim 33, wherein said apparatus includes a camera.

35. An apparatus according to claim 33, wherein said second operation device includes means for enabling said first operation device to advance into and retract from a cartridge chamber in which the cartridge is to be loaded.

36. An apparatus according to claim 33, wherein said second operation device includes means for causing said first operation device to perform one of said advancing and retracting in association with an opening and closing of a cartridge chamber cover.

37. An apparatus according to claim 33, wherein said second operation device includes means for enabling said first operation device to advance in a state where said first operation device engages the cartridge and to retract in a state where said first operation device does not engage the cartridge.

38. An apparatus according to claim 33, wherein said second operation device includes means for setting, in association with a closing operation of a cover of a cartridge chamber in which the cartridge is to be loaded, said first operation device into a state where said first operation device is engageable with the cartridge loaded in the cartridge chamber.

39. An apparatus according to claim 38, further comprising a third operation device for causing said first operation device to perform the opening operation of the cartridge in association with the closing operation of the cover of the cartridge chamber.

40. An apparatus according to claim 38, wherein said second operation device includes means for setting, in association with an opening operation of the cover of the cartridge chamber, said first operation device into a state where said first operation device is released from engaging with the cartridge loaded in the cartridge chamber.

41. An apparatus according to claim 33, further comprising a third operation device for causing said first operation device to perform the opening operation of the cartridge in association with a closing operation of a cover of a cartridge chamber in which the cartridge is to be loaded.

42. An apparatus according to claim 33, wherein said second operation device includes means for setting, in association with an opening operation of a cover of a cartridge chamber in which the cartridge is to be loaded, said first operation device into a state where said first operation device is released from engaging with the cartridge loaded in the cartridge chamber.

43. An apparatus according to claim 42, further comprising a third operation device for causing said first operation device to perform the closing operation of the cartridge in association with the opening operation of the cover of the cartridge chamber.

44. An apparatus according to claim 33, further comprising a third operation device for causing said first operation device to perform the closing operation of the cartridge in association with an opening operation of a cover of a cartridge chamber in which the cartridge is to be loaded.

45. An apparatus according to claim 33, further comprising a third operation device for causing said first operation device to perform at least one of the opening and closing operations of the cartridge in association with an opening and closing of a cartridge chamber cover.

46. An apparatus according to claim 45, wherein said third operation device includes means for motor drive.

47. An apparatus according to claim 33, wherein said second operation device includes means for motor drive.

48. An apparatus according to claim 33, wherein the film cartridge includes an opening and closing cover for taking out the film from the cartridge, as means for making the cartridge openable and closable.

49. An apparatus adapted to an image recording medium cartridge having a cartridge cover and an engaging part for driving the cartridge cover, comprising:
   a) a first operation device which performs at least one of opening and closing operations of the cartridge cover by engagement with said engaging part; and
   b) a second operation device for setting said first operation device into a state where said first operation device is engageable with the loaded cartridge, said second operation device being movable along an axis of said engaging part.

50. An apparatus according to claim 49, wherein said apparatus includes a camera.

51. An apparatus according to claim 49, wherein said second operation device includes means for moving said first operation device to a cartridge chamber in which the cartridge is to be loaded.

52. An apparatus according to claim 49, wherein said second operation device includes means for setting, in association with an opening and closing of a cartridge chamber cover, said first operation device into a state where said first operation device is engageable with the loaded cartridge.

53. An apparatus according to claim 49, wherein said second operation device includes means for moving said first operation device to be brought into a state where said first operation device is engageable with the cartridge and a state where said first operation device does not engage the cartridge.

54. An apparatus according to claim 49, wherein said second operation device includes means for setting, in association with a closing operation of a cover of a cartridge chamber in which the cartridge is to be loaded, said first operation device into a state where said first operation device is engageable with the cartridge loaded in the cartridge chamber.

55. An apparatus according to claim 54, further comprising a third operation device for causing said first operation device to perform the opening operation of the cartridge in association with the closing operation of the cover of the cartridge chamber.

56. An apparatus according to claim 54, wherein said second operation device includes means for setting, in association with an opening operation of the cover of the cartridge chamber, said first operation device into a state where said first operation device is released from engaging with the cartridge loaded in the cartridge chamber.

57. An apparatus according to claim 49, further comprising a third operation device for causing said first operation device to perform the opening operation of the cartridge in association with a closing operation of a cover of a cartridge chamber in which the cartridge is to be loaded.

58. An apparatus according to claim 49, wherein said second operation device includes means for setting, in association with an opening operation of a cover of a cartridge chamber in which the cartridge is to be loaded, said first operation device into a state where said first operation device is released from engaging with the cartridge loaded in the cartridge chamber.

59. An apparatus according to claim 58, further comprising a third operation device for causing said first operation device to perform the closing operation of the cartridge in association with the opening operation of the cover of the cartridge chamber.

60. An apparatus according to claim 49, further comprising a third operation device for causing said first operation device to perform the closing operation of the cartridge in association with an opening operation of a cover of a cartridge chamber in which the cartridge is to be loaded.

61. An apparatus according to claim 49, further comprising a third operation device for causing said first operation device to perform at least one of the opening and closing operations of the cartridge in association with an opening and closing of a cartridge chamber cover.

62. An apparatus according to claim 61, wherein said third operation device includes means for motor drive.

63. An apparatus according to claim 49, wherein said second operation device includes means for motor drive.

64. An apparatus according to claim 49, wherein the film cartridge includes an opening and closing cover for taking out the film from the cartridge, as means for making the cartridge openable and closable.

65. An apparatus adapted to a film cartridge having a cartridge cover and an engaging part for driving the cartridge cover, comprising:
   a) a cartridge chamber which loads the film cartridge;
   b) a chamber cover which opens and closes said cartridge chamber;
   c) a first operation device which performs at least one of opening and closing operations of the cartridge cover by engagement with said engaging part; and
   b) a second operation device which enables said first: operation device to advance and retract on said cartridge chamber,
      said engaging part being arranged on a body of said apparatus.

66. An apparatus according to claim 65, wherein said apparatus includes a camera.

67. An apparatus according to claim 65, wherein said second operation device includes means for enabling said first operation device to advance into and retract from a cartridge chamber in which the cartridge is to be loaded.

68. An apparatus according to claim 65, wherein said second operation device includes means for causing said first operation device to perform one of said advancing and retracting in association with an opening and closing of a cartridge chamber cover.

69. An apparatus according to claim 65, wherein said second operation device includes means for enabling said first operation device to advance in a state where said first operation device engages the cartridge and to retract in a state where said first operation device does not engage the cartridge.

70. An apparatus according to claim 65, wherein said second operation device includes means for setting, in association with a closing operation of a cover of a cartridge chamber in which the cartridge is to be loaded, said first operation device into a state where said first operation device is engageable with the cartridge loaded in the cartridge chamber.

71. An apparatus according to claim 70, further comprising a third operation device for causing said first operation device to perform the opening operation of the cartridge in association with the closing operation of the cover of the cartridge chamber.

72. An apparatus according to claim 70, wherein said second operation device includes means for setting, in association with an opening operation of the cover of the cartridge chamber, said first operation device into a state where said first operation device is released from engaging with the cartridge loaded in the cartridge chamber.

73. An apparatus according to claim 65, further comprising a third operation device for causing said first operation device to perform the opening operation of the cartridge in association with a closing operation of a cover of a cartridge chamber in which the cartridge is to be loaded.

74. An apparatus according to claim 65 wherein said second operation device includes means for setting, in association with an opening operation of a cover of a cartridge chamber in which the cartridge is to be loaded, said first operation device into a state where said first operation device is released from engaging with the cartridge loaded in the cartridge chamber.

75. An apparatus according to claim 74, further comprising a third operation device for causing said first operation device to perform the closing operation of the cartridge in association with the opening operation of the cover of the cartridge chamber.

76. An apparatus according to claim 65, further comprising a third operation device for causing said first operation device to perform the closing operation of the cartridge in association with an opening operation of a cover of a cartridge chamber in which the cartridge is to be loaded.

77. An apparatus according to claim 65, further comprising a third operation device for causing said first operation device to perform at least one of the opening and closing operations of the cartridge in association with an opening and closing of a cartridge chamber cover.

78. An apparatus according to claim 77, wherein said third operation device includes means for motor drive.

79. An apparatus according to claim 65, wherein said second operation device includes means for motor drive.

80. An apparatus according to claim 65, wherein the film cartridge includes an opening and closing cover for taking out the film from the cartridge, as means for making the cartridge openable and closable.

* * * * *